(12) United States Patent
Moore et al.

(10) Patent No.: US 8,428,893 B2
(45) Date of Patent: Apr. 23, 2013

(54) EVENT RECOGNITION

(75) Inventors: Bradford Allen Moore, Palo Alto, CA (US); Joshua H. Shaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/221,830

(22) Filed: Aug. 30, 2011

(65) Prior Publication Data

US 2011/0310047 A1 Dec. 22, 2011

Related U.S. Application Data

(63) Continuation of application No. 12/566,660, filed on Sep. 24, 2009.

(60) Provisional application No. 61/210,332, filed on Mar. 16, 2009.

(51) Int. Cl.
*G01R 15/00* (2006.01)

(52) U.S. Cl.
USPC .............................................. 702/57; 715/200

(58) Field of Classification Search ............. 702/57, 702/182–185; 715/200
See application file for complete search history.

(56) References Cited

U.S. PATENT DOCUMENTS

| | | | |
|---|---|---|---|
| 4,455,452 A | 6/1984 | Schuyler | |
| 5,488,204 A | 1/1996 | Mead et al. | 178/18 |
| 5,513,309 A | 4/1996 | Meier et al. | |
| 5,534,893 A | 7/1996 | Hansen, Jr. et al. | 345/179 |
| 5,566,337 A | 10/1996 | Szymanski et al. | 395/733 |
| 5,627,567 A | 5/1997 | Davidson | 345/173 |
| 5,627,959 A | 5/1997 | Brown et al. | 395/356 |
| 5,686,940 A | 11/1997 | Kuga | |
| 5,708,460 A | 1/1998 | Young et al. | |

(Continued)

FOREIGN PATENT DOCUMENTS

| | | |
|---|---|---|
| CN | 1841284 A | 10/2006 |
| EP | 1 517 228 A2 | 3/2005 |

(Continued)

OTHER PUBLICATIONS

International Publication No. WO 2008/030880 A1, Internation Publication Date Mar. 13, 2008, which corresponds to PCT/US2007/077645 to Forstall, Scott et al.*

(Continued)

*Primary Examiner* — Edward Raymond
(74) *Attorney, Agent, or Firm* — Morgan, Lewis & Bockius LLP

(57) ABSTRACT

A device detects a sequence of sub-events as part of a touch event associated with a view, determines that the sequence does not correspond to one or more predefined sequences of sub-events for the view associated with the touch event, and, in accordance with a determination that the sequence does not correspond to the one or more predefined sequences, sends a touch cancel event to the view associated with the touch event. Also disclosed is a device configured to detect a sequence of sub-events as part of a touch event associated with a view, determine that the sequence does not correspond to one or more predefined sequences of sub-events for the view associated with the touch event, and, in accordance with a determination that the sequence does not correspond to the one or more predefined sequences, cancel the touch event.

20 Claims, 13 Drawing Sheets

U.S. PATENT DOCUMENTS

| | | | |
|---|---|---|---|
| 5,745,116 A | 4/1998 | Pisutha-Arnond | 345/358 |
| 5,818,455 A | 10/1998 | Stone et al. | 345/619 |
| 5,880,411 A | 3/1999 | Gillespie et al. | 178/18.01 |
| 5,903,902 A | 5/1999 | Orr et al. | 707/517 |
| 5,917,477 A | 6/1999 | Lee | 345/173 |
| 6,028,602 A | 2/2000 | Weidenfeller et al. | 345/340 |
| 6,188,391 B1 | 2/2001 | Seely et al. | 345/173 |
| 6,259,436 B1 | 7/2001 | Moon et al. | 345/173 |
| 6,323,846 B1 | 11/2001 | Westerman et al. | 345/173 |
| 6,369,821 B2 | 4/2002 | Merrill et al. | |
| 6,446,083 B1 | 9/2002 | Leight et al. | 707/104.1 |
| 6,486,896 B1 | 11/2002 | Ubillos | 715/784 |
| 6,570,557 B1 | 5/2003 | Westerman et al. | 345/173 |
| 6,570,594 B1 | 5/2003 | Wagner | |
| 6,590,595 B1 | 7/2003 | Wagner et al. | |
| 6,636,242 B2 | 10/2003 | Bowman-Amuah | 715/764 |
| 6,639,584 B1 | 10/2003 | Li | 345/173 |
| 6,664,989 B1 | 12/2003 | Snyder et al. | 345/856 |
| 6,677,932 B1 | 1/2004 | Westerman | 345/173 |
| 6,677,965 B1 | 1/2004 | Ullmann et al. | 345/786 |
| 6,714,936 B1 | 3/2004 | Nevin, III | 707/102 |
| 6,735,583 B1 | 5/2004 | Bjarnestam et al. | 707/2 |
| 6,741,996 B1 | 5/2004 | Brechner et al. | 707/102 |
| 6,765,557 B1 | 7/2004 | Segal et al. | 345/173 |
| 6,778,992 B1 | 8/2004 | Searle et al. | 707/101 |
| 6,839,721 B2 | 1/2005 | Schwols | 707/200 |
| 6,903,927 B2 | 6/2005 | Anlauff | 361/681 |
| 6,957,392 B2 | 10/2005 | Simister et al. | 715/746 |
| 6,958,749 B1 | 10/2005 | Matsushita et al. | 345/175 |
| 6,963,937 B1 | 11/2005 | Kamper et al. | |
| 6,985,137 B2 | 1/2006 | Kaikuranta | 345/175 |
| 6,985,178 B1 | 1/2006 | Morita et al. | |
| 7,009,626 B2 | 3/2006 | Anwar | 345/660 |
| 7,023,427 B2 | 4/2006 | Kraus et al. | 345/173 |
| 7,088,374 B2 | 8/2006 | David et al. | 345/619 |
| 7,117,453 B2 | 10/2006 | Drucker et al. | 715/833 |
| 7,152,210 B1 | 12/2006 | Van Den Hoven et al. | |
| 7,173,623 B2 | 2/2007 | Calkins et al. | 345/473 |
| 7,337,412 B2 | 2/2008 | Guido et al. | 715/853 |
| 7,346,850 B2 | 3/2008 | Swartz et al. | 715/763 |
| 7,487,447 B1 | 2/2009 | Jerger | 715/252 |
| 7,561,159 B2 | 7/2009 | Abel et al. | 345/473 |
| 7,576,732 B2 | 8/2009 | Lii | 345/173 |
| 7,653,883 B2 | 1/2010 | Hotelling et al. | 715/863 |
| 7,750,893 B2 | 7/2010 | Hashimoto et al. | 345/173 |
| 7,844,915 B2 | 11/2010 | Platzer et al. | 715/781 |
| 7,864,037 B2 | 1/2011 | Miller | 340/506 |
| 7,872,652 B2 | 1/2011 | Platzer et al. | 345/473 |
| 7,900,156 B2 | 3/2011 | Andre et al. | |
| 7,903,115 B2 | 3/2011 | Platzer et al. | 345/473 |
| 7,917,584 B2 | 3/2011 | Arthursson | 709/205 |
| 8,051,406 B2 | 11/2011 | Knight et al. | 717/117 |
| 2001/0011998 A1 | 8/2001 | Agata et al. | 345/168 |
| 2001/0045949 A1 | 11/2001 | Chithambaram et al. | 345/418 |
| 2002/0015024 A1 | 2/2002 | Westerman et al. | |
| 2002/0194589 A1 | 12/2002 | Cristofalo et al. | 715/32 |
| 2003/0071850 A1 | 4/2003 | Geidl | |
| 2003/0071858 A1 | 4/2003 | Morohoshi | 345/856 |
| 2003/0080946 A1 | 5/2003 | Chuang | 345/173 |
| 2003/0095096 A1 | 5/2003 | Robbin et al. | 345/156 |
| 2003/0122787 A1 | 7/2003 | Zimmerman et al. | 345/173 |
| 2003/0132959 A1 | 7/2003 | Simister et al. | 345/746 |
| 2003/0160832 A1 | 8/2003 | Ridgley et al. | 345/864 |
| 2003/0174149 A1 | 9/2003 | Fujisaki et al. | 345/684 |
| 2003/0197689 A1 | 10/2003 | May | 345/173 |
| 2004/0021676 A1 | 2/2004 | Chen et al. | 345/684 |
| 2004/0021698 A1 | 2/2004 | Baldwin et al. | 345/853 |
| 2004/0027398 A1 | 2/2004 | Jaeger | |
| 2004/0095387 A1 | 5/2004 | Demsey et al. | 345/762 |
| 2004/0100479 A1 | 5/2004 | Nakano et al. | 345/700 |
| 2004/0160419 A1 | 8/2004 | Padgitt | 345/173 |
| 2004/0215643 A1 | 10/2004 | Brechner et al. | 707/100 |
| 2004/0222992 A1 | 11/2004 | Calkins et al. | 345/473 |
| 2004/0224638 A1 | 11/2004 | Fadell et al. | 455/66.1 |
| 2005/0005241 A1 | 1/2005 | Hunleth et al. | |
| 2005/0008343 A1 | 1/2005 | Frohlich et al. | |
| 2005/0017957 A1 | 1/2005 | Yi | 345/173 |
| 2005/0024341 A1 | 2/2005 | Gillespie et al. | 345/173 |
| 2005/0057524 A1 | 3/2005 | Hill et al. | 345/173 |
| 2005/0088443 A1 | 4/2005 | Blanco et al. | 345/473 |
| 2005/0162402 A1 | 7/2005 | Watanachote | 345/173 |
| 2005/0193015 A1 | 9/2005 | Logston et al. | 707/104.1 |
| 2005/0268247 A1 | 12/2005 | Baneth | 715/781 |
| 2006/0026521 A1 | 2/2006 | Hotelling et al. | 715/702 |
| 2006/0026536 A1 | 2/2006 | Hotelling et al. | 715/863 |
| 2006/0028455 A1 | 2/2006 | Hinckley et al. | |
| 2006/0036955 A1 | 2/2006 | Baudisch et al. | 715/747 |
| 2006/0038796 A1 | 2/2006 | Hinckley et al. | 345/173 |
| 2006/0066588 A1 | 3/2006 | Lyon et al. | |
| 2006/0097991 A1 | 5/2006 | Hotelling et al. | 345/173 |
| 2006/0125799 A1 | 6/2006 | Hillis et al. | 345/173 |
| 2006/0125803 A1 | 6/2006 | Westerman et al. | 345/173 |
| 2006/0161871 A1 | 7/2006 | Hotelling et al. | 715/863 |
| 2006/0190833 A1 | 8/2006 | SanGiovanni et al. | 715/767 |
| 2006/0197753 A1 | 9/2006 | Hotelling | 345/173 |
| 2006/0236263 A1 | 10/2006 | Bathiche et al. | 715/786 |
| 2006/0242607 A1 | 10/2006 | Hudson | |
| 2007/0050469 A1 | 3/2007 | Gupta et al. | 709/217 |
| 2007/0055967 A1 | 3/2007 | Poff et al. | 717/162 |
| 2007/0061126 A1 | 3/2007 | Russo et al. | |
| 2007/0064004 A1 | 3/2007 | Bonner et al. | |
| 2007/0075965 A1 | 4/2007 | Huppi et al. | 345/156 |
| 2007/0081726 A1 | 4/2007 | Westerman et al. | |
| 2007/0152976 A1 | 7/2007 | Townsend et al. | 345/173 |
| 2007/0174257 A1 | 7/2007 | Howard | 707/3 |
| 2007/0185876 A1 | 8/2007 | Mendis et al. | 707/10 |
| 2007/0214462 A1 | 9/2007 | Boillot | 719/328 |
| 2007/0242056 A1 | 10/2007 | Engelhardt et al. | 345/173 |
| 2007/0247435 A1 | 10/2007 | Benko et al. | |
| 2007/0247442 A1 | 10/2007 | Andre et al. | |
| 2007/0252821 A1 | 11/2007 | Hollemans et al. | 345/173 |
| 2007/0262964 A1 | 11/2007 | Zotov et al. | 345/173 |
| 2007/0288856 A1 | 12/2007 | Butlin et al. | 715/762 |
| 2007/0291009 A1 | 12/2007 | Wright et al. | |
| 2008/0001923 A1 | 1/2008 | Hall et al. | 345/173 |
| 2008/0005703 A1 | 1/2008 | Radivojevic et al. | 715/863 |
| 2008/0016096 A1 | 1/2008 | Wilding et al. | 707/101 |
| 2008/0028327 A1 | 1/2008 | Hirota et al. | 715/762 |
| 2008/0034029 A1 | 2/2008 | Fang et al. | 709/203 |
| 2008/0043020 A1 | 2/2008 | Snow et al. | |
| 2008/0048978 A1 | 2/2008 | Trent et al. | 345/157 |
| 2008/0094368 A1 | 4/2008 | Ording et al. | 345/173 |
| 2008/0114614 A1 | 5/2008 | Mahesh et al. | |
| 2008/0120576 A1 | 5/2008 | Kariathungal et al. | |
| 2008/0158191 A1 | 7/2008 | Yang et al. | 345/173 |
| 2008/0165132 A1 | 7/2008 | Weiss et al. | 345/173 |
| 2008/0168388 A1 | 7/2008 | Decker | 715/800 |
| 2008/0168395 A1 | 7/2008 | Ording et al. | |
| 2008/0218489 A1 | 9/2008 | Park et al. | 345/173 |
| 2008/0231610 A1 | 9/2008 | Hotelling et al. | 345/173 |
| 2009/0049388 A1 | 2/2009 | Taib et al. | 715/738 |
| 2009/0058830 A1 | 3/2009 | Herz et al. | 345/173 |
| 2009/0207140 A1 | 8/2009 | Hansson | 345/173 |
| 2009/0211891 A1 | 8/2009 | Lai et al. | 200/512 |
| 2009/0225037 A1 | 9/2009 | Williamson et al. | 345/173 |
| 2009/0225038 A1 | 9/2009 | Bolsinga et al. | 345/173 |
| 2009/0225039 A1 | 9/2009 | Williamson et al. | 345/173 |
| 2009/0259969 A1 | 10/2009 | Pallakoff | 715/808 |
| 2009/0284479 A1 | 11/2009 | Dennis et al. | 345/173 |
| 2009/0322699 A1 | 12/2009 | Hansson | 345/174 |
| 2009/0322700 A1 | 12/2009 | D'Souza et al. | 345/174 |
| 2010/0020221 A1 | 1/2010 | Tupman et al. | 348/333.1 |
| 2010/0107116 A1 | 4/2010 | Rieman et al. | |
| 2010/0146458 A1 | 6/2010 | Wadekar | 715/863 |
| 2010/0149122 A1 | 6/2010 | Lin | 345/173 |
| 2010/0182248 A1 | 7/2010 | Chun | 345/173 |
| 2010/0235118 A1 | 9/2010 | Moore et al. | 705/57 |
| 2011/0037714 A1 | 2/2011 | Seo et al. | 345/173 |

FOREIGN PATENT DOCUMENTS

| | | |
|---|---|---|
| EP | 2 141 576 A2 | 3/2005 |
| EP | 2 184 873 A1 | 5/2010 |
| GB | 2 319 591 A | 5/1998 |
| GB | 2 351 639 A | 1/2001 |
| JP | 05 298002 | 11/1993 |
| JP | 2001 290585 | 10/2001 |
| JP | 2005 056286 | 3/2005 |

| | | |
|---|---|---|
| JP | 2005 062086 | 3/2005 |
| JP | 2005 242669 | 9/2005 |
| JP | 2008 146165 | 6/2008 |
| WO | WO 02/08881 A2 | 1/2002 |
| WO | WO 02/13176 A2 | 2/2002 |
| WO | WO 2006/020305 A2 | 2/2006 |
| WO | WO 2006/067711 A2 | 6/2006 |
| WO | WO 2006/094308 A2 | 9/2006 |
| WO | WO 2006/128248 A1 | 12/2006 |
| WO | WO 2007/037806 A1 | 4/2007 |
| WO | WO 2007/079425 A2 | 7/2007 |
| WO | WO 2007/089766 A2 | 8/2007 |
| WO | WO 2008/030879 A2 | 3/2008 |
| WO | WO 2008/030880 A1 | 3/2008 |
| WO | WO 2008/085846 A2 | 7/2008 |
| WO | WO 2008/085848 A1 | 7/2008 |
| WO | WO 2008/085855 | 7/2008 |
| WO | WO 2008/085871 A1 | 7/2008 |
| WO | WO 2008/085877 A1 | 7/2008 |
| WO | WO 2009/018314 A2 | 2/2009 |
| WO | WO 2009/111189 A1 | 9/2009 |
| WO | WO 2009/111458 A1 | 9/2009 |
| WO | WO 2009/111460 | 9/2009 |
| WO | WO 2009/111489 A1 | 9/2009 |

OTHER PUBLICATIONS

European Search Report dated Jul. 9, 2012, received in European Patent Application No. 12156395.1, which corresponds to U.S. Appl. No. 12/042,318, 8 pages (Beaver).
Notice of Allowance dated Jul. 26, 2012, received in U.S. Appl. No. 12/566,660, 9 pages (Moore).
Certificate of Examination dated May 7, 2012, recieved in Australian Patent No. 2011101154, which corresponds to U.S Appl. No. 12/042,318, 1 page (Beaver).
Certificate of Examination dated May 8, 2012, received in Australian Patent No. 20111011157, which corresponds to U.S. Appl. No. 12/042,318, 1 page (Beaver).
Certificate of Examination dated May 8, 2012, received in Australian Patent No. 20111011156, which corresponds to U.S. Appl. No. 12/042,318, 1 page (Beaver).
Certificate of Examination dated May 8, 2012, received in Australian Patent No. 20111011155, which corresponds to U.S. Appl. No. 12/042,318, 1 page (Beaver).
Decision to Grant dated Jul. 27, 2012, recieved in Japanese Patent Application No. 2009080377, which corresponds to U.S. Appl. No. 12/042,318, 4 pages (Beaver).
Office Action dated Jun. 13, 2012, received in Chinese Patent Application No. 200980000014.0, which corresponds to U.S. Application No, 12/042,067, 6 pages. (Williamson).
Office Action dated Jun. 6, 2012, received in Chinese Patent Application No. 200980000013.6, which corresponds to U.S. Appl. No. 12/042,299, 7 pages (Williamson).
Office Action dated Jul. 24, 2012, received in U.S. Appl. No. 13/221,837, 25 pages (Blumberg).
Final Office Action dated Jul. 9, 2012, recieved in U.S. Appl. No. 13/251,121, 30 pages (Blumberg).
Final Office Action dated Jul. 5, 2012, received in U.S. Appl. No. 13/251,150, 36 pages (Blumenberg).
Final Office Action dated Jun. 20,2012, received in U.S. Appl. No. 13/251,150, 36 pages (Blumenberg).
Office Action dated Jun. 6, 2012, received in Chinese Patent Application No. 200880001855.9, which corresponds to U.S. Appl. No, 11/620,715 (Platzer).
Allen, J., "Override the GNU C library—painlessly," ibm.conn, Apr. 2002, 4 pages.
Anonymous, "Firegestures," Internet Article, Oct. 27, 2009, 2 pages. http://xuldev.org/firegestures/.
Anonymous, "Firegestures: Changelog," Internet Article, Oct. 28, 2009, 8 pages. http://xuldev.org/firegestures/changelog.php.
Anonymous, "Firegestures Version History," Internet Article, Oct. 28, 2009, 6 pages, http://addons.mozilla.org/en-US/firefox/addons/version/6366.

Chattier, D., "Apple releases iOS 4.3 beta for developers," Macworld. corn, Jan. 12, 2011, http://www.macworld.com/article/1157114/ios_4_3.html, 7 pages.
KennyTM, "UIGestureReCognizer," from iPhone Development Wiki, Oct. 31, 2009, 3 pages, http://iphonedevwiki.net/index.php?title=UIGestureRecognizer&oldid=319http://iphonedevwlki.net/index.php?titie=UIGestureRecognizer&action=history.
Masui et al., "Elastic Graphical Interfaces for Precise Data Manipulation," ACM Conference on Human Factors in Computing Systems (CHI'95), Apr. 1995; Conference Companion; ACM press, pp. 143-144.
Pixley, "Document Object Model (DOM) Level 2 Events Specifications Version 1,0," W3C Recommendation, pp. 1-47, Nov. 13, 2000.
Ralha, L., "Delegation: Dynamic Specialization," Proceeding of the conference on TRI-Ada '94, pp. 172-179.
Rogers, M., "It's for You! An iPhone Development Primer for the Busy College Professor," Journal of Computing Sciences iin Colleges, vol. 25, No. 1, Oct. 1, 2009, pp. 94-101.
Invitation to Pay Additional Fees dated Jul. 13, 2010, received in International Application No. PCT/US2010/027118, which corresponds to U.S. Appl. No. 12/566,660, 7 pages (Moore).
International Search Report and Written Opinion dated Oct. 5, 2010, received in International Application No. PCT/US2010/027118. which corresponds to U.S. Appl. No. 12/566,660, 19 pages (Moore).
International Preliminary Report on Patentability dated Sep. 20, 2011, received in International Application No. PCT/US2010/027118, which corresponds to U.S. Appl. No. 12/566,660, 10 pages (Moore).
European Search Report dated Dec. 7, 2011, received in European Patent Application No. 11184186.2. which corresponds to U.S. Appl. No. 12/566,660, 6 pages (Moore).
International Search Report and Written Opinion dated May 20, 2011, received in International Application No. PCT/US2011/022516, which corresponds to U.S. Appl. No. 12/789,695, 6 pages (Moore).
International Search Report and Written Opinion dated Dec. 13, 2011, received in International Patent Application No. PCT/US2011/039583, which corresponds to U.S. Appl. No. 12/892,848, 12 pages. (Dale).
Invitation to Pay Additional Fees dated Mar. 12, 2012, received in International Application No. PCT/US2011/065859, which corresponds to U.S Appl. No. 13/077,925, 10 pages (Chaudhri).
International Search Report and Written Opinion dated Jun. 1, 2012, received in International Application No. PCT/US2011/065859, which corresponds to U.S. Appl. No. 13/077,925, 22 pages (Shaffer).
International Search Report dated Apr. 16, 2009, received in International Application No. PCT/US2009/034772, which corresponds to U.S. Appl. No. 12/042,318, 3 pages (Platzer).
European Search Report dated Apr. 21, 2009, received in European Application No. 09154313.2, which corresponds to U.S. Appl. No. 12/042,318, 6 pages (Platzer).
European Search Report dated Nov. 23, 2011, received in European Patent Application No. 11184167.2, which corresponds to U.S. Appl. No. 12/042,318, 6 pages (Beaver).
European Search Report dated Nov. 24, 2011, received in European Patent Application No. 11184169.8, which corresponds to U.S. Appl. No. 12/042,318, 6 pages (Beaver).
European Search Report dated Nov. 18, 2011, received in European Patent Application No. 11184170.6, which corresponds to U.S. Appl. No. 12/042,318, 6 pages (Beaver).
European Search Report dated Nov. 18, 2011, received in European Patent Application No. 11184172.2, which corresponds to U.S. Appl. No. 12/042,318, 6 pages (Beaver).
European Search Report dated Nov. 30, 2011, received in European Patent Application No. 11184409.8, which corresponds to U.S. Appl. No. 12/042,318, 6 pages (Beaver).
International Search Report. And Written Opinion dated Jul. 3, 2009, received in International Application No. PCT/US2009/035856, which corresponds to U.S. Appl. No. 12/042,067, 15 pages (Williamson).

International Preliminary Report on Patentability dated Sep. 16, 2010, received in International Application No. PCT/US2009/035856, which corresponds to U.S. Appl. No. 12/042,067, 8 pages (Williamson).
International Search Report and Written Opinion dated Nov. 11, 2009, received in International Application No. PCT/US2009/035874, which corresponds to U.S. Appl. No 12/042,299, 8 pages (Williamson).
International Preliminary Report on Patentability dated Sep. 16, 2010, received in International Application No. PCT/US2009/035874, which corresponds to U.S. Appl. No. 12/042,299, 8 pages (Williamson).
European Search Report dated Jan. 13, 2012, received in European Patent Application No. 11184226.6, which corresponds to U.S. Appl. No. 12/042,299, 7 pages (Williamson).
European Search Report dated Jan. 13, 2012, received in European Patent Application No. 11184224.1, which corresponds to U.S. Appl. No. 12/042,299, 7 pages (Williamson).
International Search Report and Written Opinion dated Jul. 31. 2008, received in International Application No. PCT/US2008/000058, which corresponds to U.S. Appl. No. 11/620,709 (Platter).
International Preliminary Report on Patentability dated Jul. 7, 2009, received iri International Application No. PCT/US2008/000058, which corresponds to U.S. Appl. No. 11/620,709 (Platzer).
International Search Report and Written Opinion dated Apr. 22, 2008, received in International Application No. PCT/US2008/000060, which corresponds to U.S. Appl. No. 11/620,727 (Blumenberg).
International Preliminary Report on Patentaidility dated Jul. 7, 2009, received in International Application No. PCT/US2008/000060, which corresponds to U.S. Appl. No. 11/620,727 (Blumenberg).
International Search Report and Written Opinion dated May 2, 2008, received in International Application No. PCT/US2008/000069, which corresponds to U.S. Appl. No. 11/620,715 (Platzer).
International Preliminary Report on Patentability dated Jul. 7, 2009, received in International Application No. PCT/US2008/000069, which corresponds to U.S. Appl. No. 11/620,715 (Platzer).
International Search Report and Written Opinion dated Jun. 4, 2008, received in International Application No. PCT/US2008/000089, which corresponds to U.S. Appl. No. 11/620,717 (Platzer).
International Preliminary Report on Patentability dated Jul. 7, 2009, received in International Application No. PCT/US2008/000089, which corresponds to U.S. Appl. No. 11/620,717 (Platzer).
International Search Report and Written Opinion dated Jun. 3, 2008, received in International Application No. PCT/US2008/000103, which corresponds to U.S. Appl. No. 11/620,723 (Platzer).
International Preliminary Report on Patentability dated Jul. 7, 2009, received in International Application No. PCT/US2008/000103, which corresponds to U.S. Appl. No. 11/620,723 (Platzer).
Office Action dated Dec. 9, 2011, received in U.S. Appl. No. 12/666,660, 14 pages (Moore).
Notice of Allowance dated May 24, 2012, received in U.S. Appl. No. 12/566,660, 10 pages (Moore).
Office Action dated Feb. 16, 2011, received in U.S. Appl. No. 12/042,318, 26 pages (Beaver).
Final Office Action dated Sep. 15, 2011, received in U.S Appl. No. 12/042,318 (Beaver).
Office Action dated Feb. 25, 2011, received in Australian Patent Application No.2009200493, which corresponds to U.S. Application No. 12/042,318 ;Beaver).
Office Action dated Aug. 9, 2011, received in Australian Patent Application No. 2009200493, which corresponds to U.S. Appl. No. 12/042,318, 2 pages (Beaver).
Office Action dated Feb. 22, 2012, received in Australian Patent Application No. 2011205170, which corresponds to U.S. Appl. No. 12/042,318, 3 pages (Beaver).
Office Action dated Dec. 13, 2011, received in Australian Patent Application No. 2011101154. which corresponds to U.S. Appl. No. 12/042,318 4 pages (Beaver).
Office Action dated Dec. 13, 2011, received in Australian Patent Application No. 2011101157, which corresponds to U.S. Appl. No. 12/042,318, 4 pages (Beaver).
Office Action dated Dec. 13, 2011, received in Australian Patent Application No. 2011101156, which corresponds to U.S. Appl. No. 12/042,318, 3 pages (Beaver).
Office Action dated Dec. 13, 2011, received in Australian Patent Application No. 2011101155, which corresponds to U.S. Appl. No. 12/042,318, 3 pages (Beaver).
Grant for invention Patent dated Mar. 22, 2011, received in Chinese Patent Application No. ZL200910118596.4, which corresponds to U.S. Appl. No. 12/042,318 (Beaver).
Office Action dated Mar. 2, 2011, received in European Patent Application No. 11150786.9, which corresponds to U.S. Appl. No. 12/042,318 (Beaver).
Office Action dated Aug. 26, 2011, received in Japanese Patent Application No. 2009-080377, which corresponds to U.S. Appl. No. 12/042,318, 2 pages (Beaver).
Office Action dated Jan. 18, 2011, received in U.S. Appl. No. 12/042,067 (Williamson).
Final Office Action dated Jul. 28, 2011, received in U.S. Appl. No. 12/042,067 (Williamson).
Office Action dated Oct. 19, 2011, received in Chinese Patent Application No. 200980000014.0, which corresponds to U.S. Appl. No. 12/042,067, 15 pages (Williamson).
Office Action dated Oct. 19, 2010, received in German Patent Application No, 11 2009 000 001.0. which corresponds to U.S. Appl. No. 12/042,067 (Williamson).
Office Action dated Oct. 15, 2010, received in European Patent Application No. 09 700 006.1; which corresponds to U.S. Appl. No. 12/042,067 (Williamson).
Office Action dated Oct. 24, 2011, received in Japanese Patent Application No. 2010502.356, which corresponds to U.S. Appl. No. 12/042,067, 2 pp. (Williamson).
Office Action dated Jan. 4, 2011, received in U.S. Appl. No. 12/042,299 (Williamson).
Final Office Action dated Jul. 8, 2011, received in U.S. Appl. No. 12/042,290 (Williamson).
Office Action dated May 3, 2012, received in U.S. Appl. No. 12/042,299, 14 pages (Williamson).
Office Action dated Oct. 26, 2011, received in Chinese Patent Application No. 200980000013.6, which corresponds to U.S. Appl. No. 12/042,299, 11 pages (Williamson).
Office Action dated Aug. 10, 2010; received in German Patent Application No. 11 2009 000 003.7. which corresponds to U.S. Appl. No. 12/042,299 (Williamson).
Office Action dated Nov. 26, 2010, received in European Patent Application No. 09 700 007,9 which corresponds to U.S. Appl. No. 12/402,299 (Williamson).
Action dated Aug. 15, 2011, received in Japanese Patent Application No. 2010 502358, which corresponds to U.S. Appl. No. 12/042,299, 2 pages (Williamson).
Decision to Grant dated Mar. 23, 2012, received in Japanese Patent Application No. 2010-502358, which corresponds to U.S. Appl. No. 12/042,299, 2 pages (Williamson).
Office Action dated Sep. 14, 2011, received in U.S. Appl. No. 12/042,237, 8 pages (Bolsinga).
Notice of Allowance dated Mar. 6, 2012, received in U.S. Appl. No. 12/042,237, 16 pages (Bolsinga).
Office Action dated Jul. 14, 2011, received in Chinese Patent Application No. 200980000015.5, which corresponds to U.S. Appl. No. 12/042,237, 8 pages (Bolsinga).
Office Action dated Feb. 22, 2012, received in Chinese Patent Application No. 200980000015.5, which corresponds to U.S. Appl. No. 12/042,237, 9 pages (Bolsinga).
Office Action dated Jan. 16, 2012, received in Japanese Patent Application No. 2010-502357, which corresponds to U.S Appl. No. 12/042,237, 2 pages (Bolsinga).
Notice of Allowance dated May 23, 2012, received in U.S. Appl. No. 13/221;830, 8 pages (Moore).
Office Action dated Jun. 20, 2012, received in U.S. Appl. No. 12/869,182, 18 pages (Platzer).
Final Office Action dated Mar. 12, 2012, received in U.S. Appl. No. 11/620,727 21 pages (Blumenberg).
Final Office Action dated Jun. 20, 2012, receieved in U.S. Appl. No. 13/251,146, 28 pages (Blumenberg).

Office Action dated Jun. 18. 2012, received in U.S. Appl. No. 13/464,800, 10 pages (Boisinge).
Office Action dated Apr. 1, 2009, received in U.S. Appl. No. 11/620,709 (Platzer).
Final Office Action dated Nov. 13. 2009, received in U.S. Appl. No. 11/620,709 (Platzer).
Office Action dated Jun. 9, 2010, received in U.S. Appl. No. 11/620,709.
Office Action dated Jul. 8, 2009, received in U.S. Appl. No. 11/620,717 (Platzer).
Office Action dated Dec. 29, 2009, received in U.S. Appl. No. 11/620,717 (Platzer).
Notice of Allowance dated Jul. 20, 2010, received in U.S. Appl. No. 11/620,717.
Office Action dated Apr. 1, 2009, received in U.S. Appl. No. 11/620,723 (Platzer).
Final Office Action dated Nov. 17, 2009, received in U.S. Appl. No. 11/620,723 (Platzer).
Office Action dated Jun. 8, 2010, received in U.S. Appl. No. 11/620,723.
Patent Examination Report No. 1 dated Oct. 17, 2012, received in Austrailian Patent Application No. 2010266120, which corresponds to U.S. Appl. No. 12/566,660, 3 pages (Moore).
Notice of Allowance dated Nov. 2, 2012, received in Canadian Patent Application No. 2755443, which corresponds to U.S. Appl. No. 12/566,660, 1 page (Moore).
Office Action dated Oct. 19, 2012, received in Chinese Patent Application No. 201120580018.5, which corresponds to U.S. Appl. No. 13/077,925, 4 pages (Shaffer).
Apple, "Safari Web Content Guide for iPhone," Apple Inc., Feb. 5, 2005, 96 pages.
Chen, T., "The Web is Everywhere," IEEE Communications Magazine, Feb. 5, 2008, 1 page.
Search Report dated Jun. 2012, received in Dutch Patent Application No. 2007993, which corresponds to U.S. Appl. No. 12/789,695, 8 pages (Shaffer).
Office Action dated Oct. 22, 2012, received in Chinese Patent Application No. 201110063183.8, which corresponds to U.S. Appl. No. 12/789,695, 8 pages (Shaffer).
Office Action dated Oct. 9, 2012, received in U.S. Appl. No. 12/892,851, 22 pages (Dale).
Office Action dated Sep. 3, 2012, recieved in Australian Patent Application No. 2011265335, which corresponds to U.S. Appl. No. 12/042,318, 2 pages (Beaver).
Notice of Acceptance dated Nov. 8, 2012, received in Austrailian Patent Application No. 2011265335, which corresponds to U.S. Appl. No. 12/042,318, 3 pages (Beaver).
Decision to Grant Jul. 26, 2012, received in European Patent Application No. 11150786.9, which corresponds to U.S. Appl. No. 12/042,318, 1 page (Beaver).
Office Action dated Sep. 26, 2012, received in German Patent Application No. 11 2009 000 001.0, which corresponds to U.S. Appl. No. 12/042,067, 5 pages (Williamson).
Office Action dated Sep. 26, 2012, received in German Patent Application No. 11 2009 000 003.7, which corresponds to U.S. Appl. No. 12/042,299, 5 pages (Williamson).
Office Action dated Sep. 12, 2012, received in European Patent Application No. 11184226.6, which corresponds to U.S. Appl. No. 12/402,299, 5 pages (Williamson).
Office Action dated Sep. 12, 2012, received in European Patent Application No. 11184224.1, which corresponds to U.S. Appl. No. 12/402,299, 4 pages (Williamson).
Office Action dated Sep. 12, 2012, received in European Patent Application No. 11184223.3, which corresponds to U.S. Appl. No. 12/402,299, 4 pages (Williamson).
Office Action dated Sep. 12, 2012, received in European Patent Application No. 11184222.5, which corresponds to U.S. Appl. No. 12/402,299, 4 pages (Williamson).
Office Action dated Nov. 21, 2012, received in U.S. Appl. No. 13/163,624, 29 pages (Williamson).
Office Action dated Nov. 26, 2012, received in U.S. Appl. No. 13/163,626, 29 pages (Williamson).
Office Action dated Sep. 11, 2012, received in Chinese Patent Application No. 200980000015.5, which corresponds to U.S. Appl. No. 12/042,237, 9 pages (Bolsinga).
Office Action dated Sep. 26, 2012, received in German Patent Application No. 11 2009 000 002.9, which corresponds to U.S. Appl. No. 12/042,237, 5 pages (Bolsinga).
Office Action dated Nov. 11, 2010, received in Chinese Patent Application No. 200880001827.7, which corresponds to U.S. Appl. No. 11/620,717, 6 pages (Platzer).
Office Action dated Jan. 29, 2012, received in Chinese Patent Application No. 2008800018227, which corresponds to U.S. Appl. No. 11/620,717, 5 pages (Platzer).
Notice of Allowance dated Dec. 12, 2012, recieved in U.S. Appl. No. 12/869,182, 8 pages (Platzer).
Office Action dated Aug. 15, 2012, received in U.S. Appl. No. 11/620,727, 19 pages (Blumenberg).
Office Action dated Nov. 5, 2012, received in U.S. Appl. No. 13/221,836, 31 pages (Blumenberg).
Office Action dated Aug. 29, 2012, received in U.S. Appl. No. 11/620,715, 20 pages (Platzer).
Office Action dated Oct. 30, 2012, received in European Patent Application No. 08 712 946.6, which corresponds to U.S. Appl. No. 11/620,715, 20 pages (Platzer).
Notice of Allowance dated Nov. 13, 2012, received in U.S. Appl. No. 13/464,800, 20 pages (Bolsinga).

* cited by examiner

Sub-Event Sequence 465

- Detect finger down 465-1
- Measure delay 465-2
- Detect finger vertical swipe of at least N pixels 465-3
- Detect finger lift off 465-4

Vertical Swipe Event Recognizer 468

Actively Involved View Input Source Handler 480

Sub-Event Sequence 520

- Detect finger down 521-1
- Measure delay 521-2
- Detect finger liftoff 521-3

Sub-Event Sequence 530

- Detect finger down 531-1
- Measure delay 531-2
- Detect finger movement 531-3
- Detect finger lift off 531-4

Sub-Event Sequence 540

- Detect finger down 541-1
- Measure delay 541-2
- Detect finger liftoff 541-3
- Measure delay 541-4
- Detect finger down 541-5
- Measure delay 541-6
- Detect finger liftoff 541-7

Double Tap Event Recognizer 570

Tap Event Recognizer 590

EVENT RECOGNITION

RELATED APPLICATIONS

This application is a continuation of U.S. patent application Ser. No. 12/566,660, filed Sep. 24, 2009, entitled "Event Recognition," which claims priority to U.S. Provisional Patent Application Ser. No. 61/210,332, filed on Mar. 16, 2009, entitled "Event Recognition." Both of these applications are incorporated by reference herein in their entirety.

TECHNICAL FIELD

The disclosed embodiments relate generally to user interface processing. More particularly, the disclosed embodiments relate to apparatuses and methods for recognizing user interface events.

BACKGROUND

A computing device typically includes a user interface that may be used to interact with the computing device. The user interface may include a display and/or input devices such as a keyboard, mice, and touch-sensitive surfaces for interacting with various aspects of the user interface. In some devices with a touch-sensitive surface as an input device, a first set of touch-based gestures (e.g., two or more of: tap, double tap, horizontal swipe, vertical swipe, pinch, depinch, two finger swipe) are recognized as proper inputs in a particular context (e.g., in a particular mode of a first application), and other, different sets of touch-based gestures are recognized as proper inputs in other contexts (e.g., different applications and/or different modes or contexts within the first application). As a result, the software and logic required for recognizing and responding to touch-based gestures can become complex, and can require revision each time an application is updated or a new application is added to the computing device. These and similar issues may arise in user interfaces that utilize input sources other than touch-based gestures.

Thus, it would be desirable to have a comprehensive framework or mechanism for recognizing touch-based gestures and events, as well as gestures and events from other input sources, that is easily adaptable to virtually all contexts or modes of all application programs on a computing device, and that requires little or no revision when an application is updated or a new application is added to the computing device.

SUMMARY

To address the aforementioned drawbacks, some embodiments provide a method, which, at an electronic device configured to execute software that includes a view hierarchy with a plurality of views: displays one or more views of the view hierarchy; executes one or more software elements, each software element being associated with a particular view, wherein each particular view includes one or more event recognizers. Each event recognizer has an event definition based on one or more sub-events, and an event handler, wherein the event handler specifies an action for a target, and is configured to send the action to the target in response to the event recognizer detecting an event corresponding to the event definition. The method also detects a sequence of one or more sub-events, and identifies one of the views of the view hierarchy as a hit view, wherein the hit view establishes which views in the view hierarchy are actively involved views. The method also delivers a respective sub-event to event recognizers for each actively involved view within the view hierarchy, wherein each event recognizer for actively involved views in the view hierarchy processes the respective sub-event prior to processing a next sub-event in the sequence of sub-events.

Some embodiments provide a method, which, at an electronic device configured to execute software that includes a view hierarchy with a plurality of views: displays one or more views of the view hierarchy; executes one or more software elements, each software element being associated with a particular view, wherein each particular view includes one or more event recognizers. Each event recognizer has an event definition based on one or more sub-events, and an event handler, wherein the event handler specifies an action for a target, and is configured to send the action to the target in response to the event recognizer detecting an event corresponding to the event definition. The method also detects a sequence of one or more sub-events, and identifies one of the views of the view hierarchy as a hit view, wherein the hit view establishes which views in the view hierarchy are actively involved views. The method also delivers a respective sub-event to event recognizers for each actively involved view within the view hierarchy, and makes a sub-event recognition decision while processing the respective sub-event at event recognizers for the actively involved views in the view hierarchy.

Some embodiments provide a computer readable storage medium storing one or more programs for execution by one of more processors of a computer system or device, the one or more programs including one or more application programs for displaying one or more views of a view hierarchy with a plurality of views. The one or more application programs include one or more software elements, each software element being associated with a particular view, wherein each particular view includes one or more event recognizers. Each event recognizer has an event definition based on one or more sub-events, and an event handler, wherein the event handler: specifies an action for a target, and is configured to send the action to the target in response to the event recognizer detecting an event corresponding to the event definition; event management instructions, which when executed by the one or more processors of the computer system or device, cause the computer system or device to: detect a sequence of one or more sub-events; identify one of the views of the view hierarchy as a hit view, wherein the hit view establishes which views in the view hierarchy are actively involved views; and deliver a respective sub-event to event recognizers for each actively involved view within the view hierarchy, wherein each event recognizer for actively involved views in the view hierarchy processes the respective sub-event prior to processing a next sub-event in the sequence of sub-events.

Some embodiments provide an apparatus comprising a display, one or more processors, memory, and one or more programs stored in the memory, which are configured to display one or more views of a view hierarchy with a plurality of views. The one or more programs include one or more software elements, each software element being associated with a particular view, wherein each particular view includes one or more event recognizers. The event recognizers have an event definition based on one or more sub-events, and an event handler, wherein the event handler specifies an action for a target, and is configured to send the action to the target in response to the event recognizer detecting an event corresponding to the event definition. The apparatus's programs also include an event delivery program, which, when executed by the one or more processors of the apparatus, cause the apparatus to detect a sequence of one or more sub-events; identify one of the views of the view hierarchy as a hit view, wherein the hit view establishes which views in the view hierarchy are actively involved views; and make a sub-event recognition decision while event recognizers for the actively involved views in the view hierarchy process the respective sub-event.

In some embodiments, an apparatus is provided that comprises one or more processors, memory, and one or more programs stored in the memory, which are configured to manage execution of one or more programmatic layers of a programmatic hierarchy with a plurality of programmatic layers. The one or more programs include one or more software elements, each software element being associated with a particular programmatic layer, wherein each particular programmatic layer includes one or more event recognizers. The event recognizers have an event definition based on one or more sub-events, and an event handler, wherein the event handler specifies an action for a target and is configured to send the action to the target in response to the event recognizer detecting an event corresponding to the event definition. The apparatus also includes an event delivery program, which, when executed by the one or more processors of the apparatus, cause the apparatus to detect a sequence of one or more sub-events; identify one of the programmatic layers of the programmatic hierarchy as a hit layer, wherein the hit layer establishes which programmatic layers in the programmatic hierarchy are actively involved programmatic layers; and deliver a respective sub-event to event recognizers for each actively involved programmatic layer within the programmatic hierarchy, wherein each event recognizer for actively involved layers in the programmatic hierarchy processes the respective sub-event prior to processing a next sub-event in the sequence of sub-events.

BRIEF DESCRIPTION OF THE DRAWINGS

Like reference numerals refer to corresponding parts throughout the drawings.

DESCRIPTION OF EMBODIMENTS

Figure 1A:
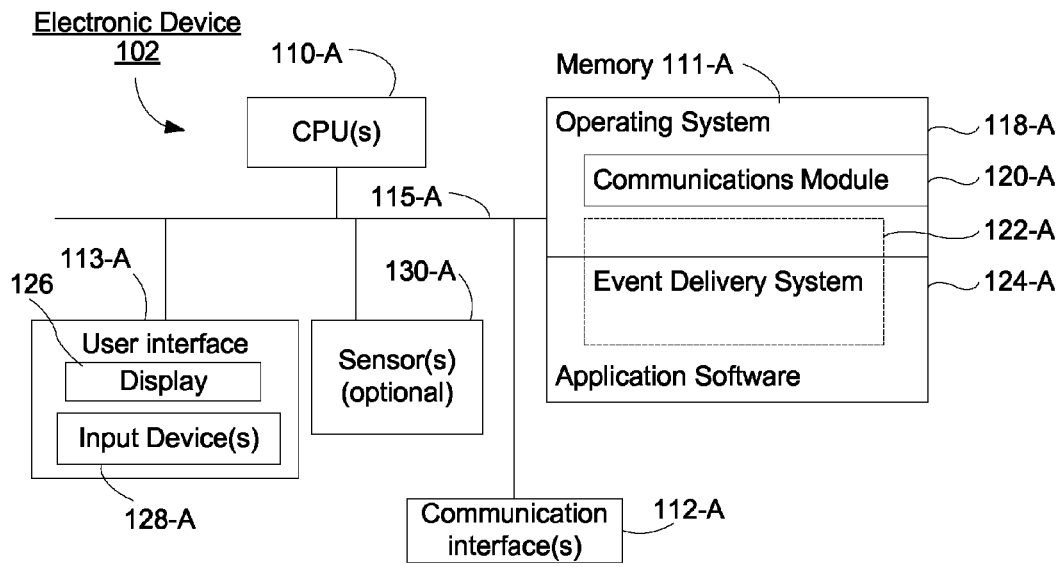
FIGS. 1A and 1B are block diagrams illustrating electronic devices, according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As noted above, in some devices with a touch-sensitive surface as an input device, a first set of touch-based gestures (e.g., two or more of: tap, double tap, horizontal swipe, vertical swipe) are recognized as proper inputs in a particular context (e.g., in a particular mode of a first application), and other, different sets of touch-based gestures are recognized as proper inputs in other contexts (e.g., different applications and/or different modes or contexts within the first application). As a result, the software and logic required for recognizing and responding to touch-based gestures can become complex, and can require revision each time an application is updated or a new application is added to the computing device.

In the embodiments described below, touch-based gestures are events. Upon recognition of a predefined event, e.g., an event that corresponds to a proper input in the current context of an application, information concerning the event is delivered to the application. In the context of this document, all touch-based gestures correspond to events. Furthermore, each respective event is defined as a sequence of sub-events. In devices that have a multi-touch display device (often herein called "screens") or other multi-touch sensitive surface, and that accept multi-touch-based gestures, the sub-events that define a multi-touched based event may include multi-touch sub-events (requiring two or more fingers to be simultaneously in contact with the device's touch-sensitive surface). For example, in a device having a multi-touch sensitive display, a respective multi-touch sequence of sub-events may begin when a user's finger first touches the screen. Additional sub-events may occur when one or more additional fingers subsequently or concurrently touch the screen, and yet other sub-events may occur when all of the fingers touching the screen move across the screen. The sequence ends when the last of the user's fingers is lifted from the screen.

When using touch-based gestures to control an application running in a device having a touch-sensitive surface, touches have both temporal and spatial aspects. The temporal aspect, called a phase, indicates when a touch has just begun, whether it is moving or stationary, and when it ends—that is, when the finger is lifted from the screen. A spatial aspect of a touch is the set of views or user interface windows in which the touch occurs. The views or windows in which a touch is detected may correspond to programmatic levels within a programmatic or view hierarchy. For example, the lowest level view in which a touch is detected may be called the hit view, and the set of events that are recognized as proper inputs may be determined based, at least in part, on the hit view of the initial touch that begins a touch-based gesture.

Figure 1B:
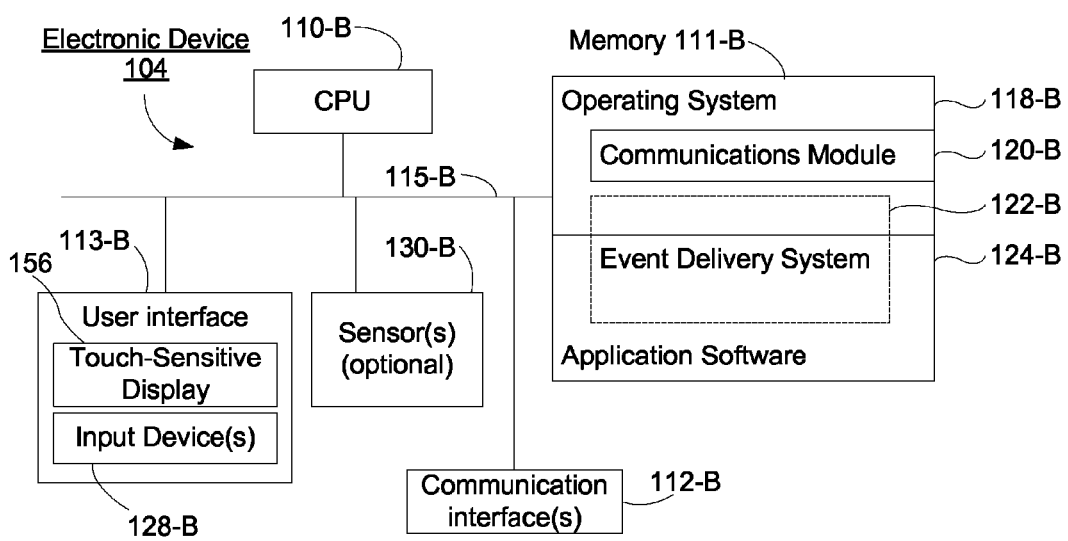

FIGS. 1A and 1B are block diagrams illustrating electronic devices 102 and 104, according to some embodiments. The electronic devices 102 and 104 may be any electronic device including, but not limited to, a desktop computer system, a laptop computer system, mobile phone, a smart phone, a personal digital assistant, or a navigation system. The electronic device may also be a portable electronic device with a touch screen display (e.g., display 156, FIG. 1B) configured to present a user interface, a computer with a touch screen display configured to present a user interface, a computer with a touch sensitive surface and a display configured to present a user interface, or any other form of computing device, including without limitation, consumer electronic devices, mobile telephones, video game systems, electronic music players, tablet PCs, electronic book reading systems, e-books, PDAs, electronic organizers, email devices, laptops or other computers, kiosk computers, vending machines, smart appliances, etc. The electronic devices 102 and 104 may include user interfaces 113-A and 113-B, respectively.

In some embodiments, the electronic devices 102 and 104 include a touch screen display. In these embodiments, the user interface 113 (i.e., 113-A or 113-B) may include an on-screen keyboard (not depicted) that is used by a user to interact with the electronic devices 102 and 104. Alternatively, a keyboard may be separate and distinct from the electronic devices 102 and 104. For example, a keyboard may be a wired or wireless keyboard coupled to the electronic devices 102 or 104.

In some embodiments, the electronic device 102 includes a display 126 and one or more input devices 128-A (e.g., keyboard, mouse, trackball, microphone, physical button(s), touchpad, etc.) that are coupled to the electronic device 102. In these embodiments, one or more of the input devices 128-A may optionally be separate and distinct from the electronic device 102. For example, the one or more input devices may include one or more of: a keyboard, a mouse, a trackpad, a trackball, and an electronic pen, any of which may optionally be separate from the electronic device. Optionally, the device 102 or 104 may include one or more sensors 130, such as one or more accelerometers, gyroscopes, GPS systems, speakers, infrared (IR) sensors, biometric sensors, cameras, etc. It is noted that the description above of various exemplary devices as input devices 128 or as sensors 130 is of no significance to the operation of the embodiments described herein, and that any input or sensor device herein described as an input device may equally well be described as a sensor, and vice versa. In some embodiments, signals produced by the one or more sensors 130 are used as input sources for detecting events.

In some embodiments, the electronic device 104 includes a touch-sensitive display 156 (i.e., a display having a touch-sensitive surface) and one or more input devices 128-B that are coupled to the electronic device 104. In some embodiments, the touch-sensitive display 156 has the ability to detect two or more distinct, concurrent (or partially concurrent) touches, and in these embodiments, the display 156 is sometimes herein called a multitouch display or multitouch-sensitive display.

In some embodiments of the electronic device 102 or 104 discussed herein, the input devices 128 are disposed in the electronic device 102 or 104. In other embodiments, one or more of the input devices 128 is separate and distinct from the electronic device 102 or 104; for example, one or more of the input devices 128 may be coupled to the electronic device 102 or 104 by a cable (e.g., USB cable) or wireless connection (e.g., Bluetooth connection).

When using the input devices 128, or when performing a touch-based gesture on the touch-sensitive display 156 of an electronic device 102 or 104, respectively, the user generates a sequence of sub-events that are processed by one or more CPUs 110 of the electronic device 102 or 104. In some embodiments, the one or more CPUs 110 of the electronic device 102 or 104 process the sequence of sub-events to recognize events.

The electronic device 102 or 104 typically includes one or more single- or multi-core processing units ("CPU" or "CPUs") 110 as well as one or more network or other communications interfaces 112, respectively. The electronic device 102 or 104 includes memory 111 and one or more communication buses 115, respectively, for interconnecting these components. The communication buses 115 may include circuitry (sometimes called a chipset) that interconnects and controls communications between system components (not depicted herein). As discussed briefly above, the electronic devices 102 and 104 optionally include user interfaces 113 that include a display 126 and multitouch display 156, respectively. Further, the electronic devices 102 and 104 typically include input devices 128 (e.g., keyboard, mouse, touch screens, touch sensitive surfaces, multitouch screens, keypads, etc.). In some embodiments, the input devices include an on-screen input device (e.g., a touch-sensitive surface of a display device). Memory 111 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 111 may optionally include one or more storage devices remotely located from the CPU(s) 110. Memory 111, or alternately the non-volatile memory device(s) within memory 111, comprise a computer readable storage medium. In some embodiments, memory 111 stores the following programs, modules and data structures, or a subset thereof:

- an operating system 118 that includes procedures for handling various basic system services and for performing hardware dependent tasks;
- a communication module 120 (in electronic devices 102 and 104, respectively) that is used for connecting the electronic device 102 or 104, respectively, to other devices via their one or more respective communication interfaces 112 (wired or wireless) and one or more communication networks, such as the Internet, other wide area networks, local area networks, metropolitan area networks, and so on;
- an event delivery system 122 (in electronic devices 102 and 104, respectively) that may be implemented in various alternate embodiments within the operating system 118 or in application software 124; in some embodiments, however, some aspects of event delivery system 122 may be implemented in the operating system 118 while other aspects are implemented in application software 124; and one or more applications in application software 124, respectively (e.g., an email application, a web browser application, a text messaging application, etc.).

Each of the above identified elements may be stored in one or more of the previously mentioned memory devices, and corresponds to a set of instructions for performing functions described herein. The set of instructions can be executed by one or more processors (e.g., the one or more CPUs 110). The above identified modules or programs (i.e., sets of instructions) need not be implemented as separate software programs, procedures or modules, and thus various subsets of these modules may be combined or otherwise rearranged in various embodiments. In some embodiments, memory 111 may store a subset of the modules and data structures identified above. Furthermore, memory 111 may store additional modules and data structures not described above.

Figure 2:
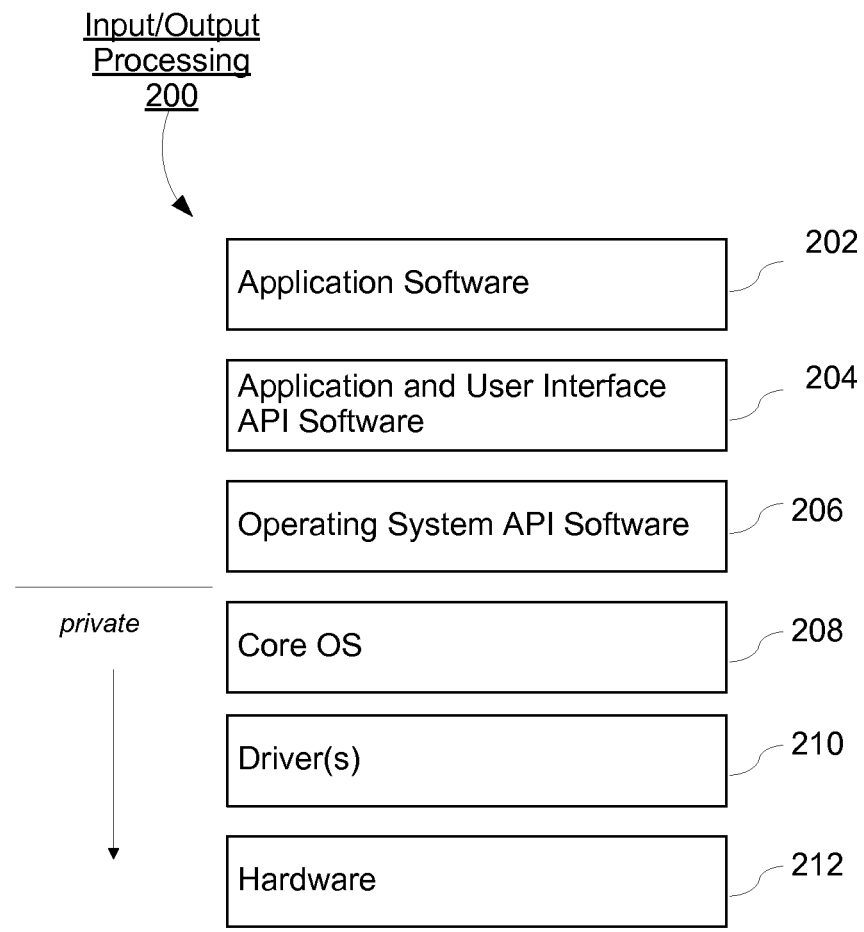
FIG. 2 is a diagram of an input/output processing stack of an exemplary electronic device according to some embodiments.

FIG. 2 is a diagram of an input/output processing stack 200 of an exemplary electronic device or apparatus (e.g., device 102 or 104) according to some embodiments of the invention. The hardware (e.g., electronic circuitry) 212 of the device is at the base level of the input/output processing stack 200. Hardware 212 can include various hardware interface components, such as the components depicted in FIGS. 1A and/or 1B. Hardware 212 can also include one or more of the above mentioned sensors 130. All the other elements (202-210) of the input/output processing stack 200 are software procedures, or portions of software procedures, that process inputs received from the hardware 212 and generate various outputs that are presented through a hardware user interface (e.g., one or more of a display, speakers, device vibration actuator).

A driver or a set of drivers 210 communicates with the hardware 212. The drivers 210 can receive and process input data received from the hardware 212. A core Operating System ("OS") 208 can communicate with the driver(s) 210. The core OS 208 can process raw input data received from the driver(s) 210. In some embodiments, the drivers 210 can be considered to be a part of the core OS 208.

A set of OS application programming interfaces ("OS APIs") 206, are software procedures that communicate with the core OS 208. In some embodiments, the APIs 206 are included in the device's operating system, but at a level above the core OS 208. The APIs 206 are designed for use by applications running on the electronic devices or apparatuses discussed herein. User interface (UI) APIs 204 can utilize the OS APIs 206. Application software ("applications") 202 running on the device can utilize the UI APIs 204 in order to communicate with the user. The UI APIs 204 can, in turn, communicate with lower level elements, ultimately communicating with various user interface hardware, e.g., multi-touch display 156.

While each layer input/output processing stack 200 can utilize the layer underneath it, that is not always required. For example, in some embodiments, applications 202 can occasionally communicate with OS APIs 206. In general, layers at or above the OS API layer 206 may not directly access the Core OS 208, driver(s) 210, or hardware 212, as these layers are considered private. Applications in layer 202 and the UI API 204 usually direct calls to the OS API 206, which in turn, accesses the layers Core OS 208, driver(s) 210, and hardware 212.

Stated in another way, one or more hardware elements 212 of the electronic device 102 or 104, and software running on the device, such as, for example, drivers 210 (depicted in FIG. 2), core OS (operating system) 208 (depicted in FIG. 2), operating system API software 206 (depicted in FIG. 2), and Application and User Interface API software 204 (depicted in FIG. 2) detect input events (which may correspond to sub-events in a gesture) at one or more of the input device(s) 128 and/or a touch-sensitive display 156 and generate or update various data structures (stored in memory of the device 102 or 104) used by a set of currently active event recognizers to determine whether and when the input events correspond to an event to be delivered to an application 202. Embodiments of event recognition methodologies, apparatus and computer program products are described in more detail below.

Figure 3A:
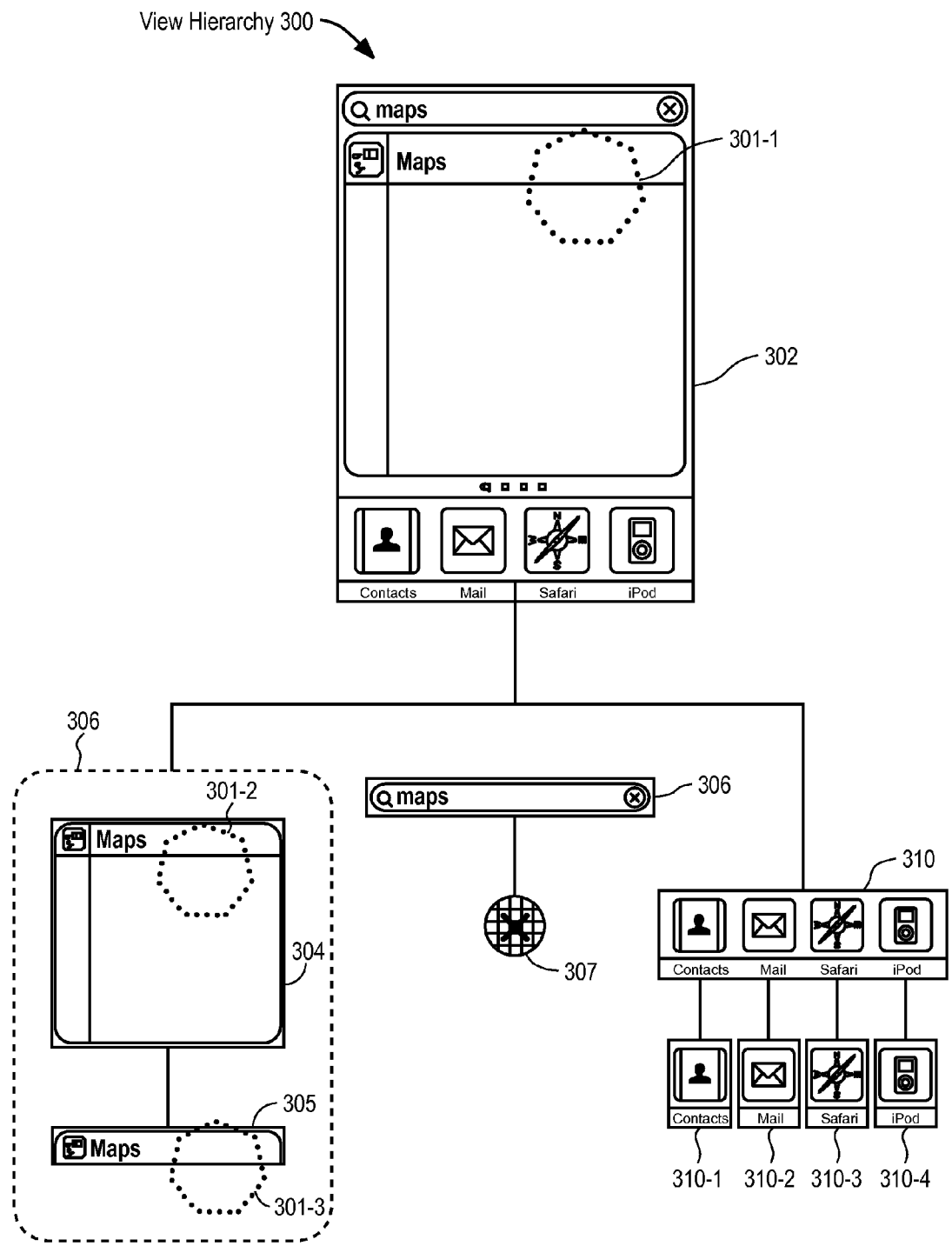
FIG. 3A illustrates an exemplary view hierarchy, according to some embodiments.

FIG. 3A depicts an exemplary view hierarchy 300, which in this example is a search program displayed in outermost view 302. Outermost view 302 generally encompasses the entire user interface a user may directly interact with, and includes subordinate views, e.g., search results panel 304, which groups search results and can be scrolled vertically;

search field 306, which accepts text inputs; and a home row 310, which groups applications for quick access.

In this example, each subordinate view includes lower-level subordinate views. In other examples, the number of view levels in the hierarchy 300 may differ in different branches of the hierarchy, with one or more subordinate views having lower-level subordinate views, and one or more other subordinate views not have any such lower-level subordinate views. Continuing with the example shown in FIG. 3A, search results panel 304 contains separate subordinate views 305 (subordinate to the panel 304) for each search result. Here, this example shows one search result in a subordinate view called the maps view 305. Search field 306 includes a subordinate view herein called the clear contents icon view 307, which clears the contents of the search field when a user performs a particular action (e.g., a single touch or tap gesture) on the clear contents icon in the view 307. Home row 310 includes subordinate views 310-1, 310-2, 310-3, and 310-4, which respectively correspond to a contacts application, an email application, a web browser, and an iPod music interface.

A touch sub-event 301-1 is represented in outermost view 302. Given the location of touch sub-event 301-1 over both the search results panel 304, and maps view 305, the touch sub-event is also represented over those views as 301-2 and 301-3, respectively. Actively involved views of the touch sub-event include the views search results panel 304, maps view 305 and outermost view 302. Additional information regarding sub-event delivery and actively involved views is provided below with reference to FIGS. 3B and 3C.

Views (and corresponding programmatic levels) can be nested. In other words, a view can include other views. Consequently, the software element(s) (e.g., event recognizers) associated with a first view can include or be linked to one or more software elements associated with views within the first view. While some views can be associated with applications, others can be associated with high level OS elements, such as graphical user interfaces, window managers, etc.

To simplify subsequent discussion, reference will generally be made only to views and the view hierarchy, but it must be understood that in some embodiments, the method may operate with a programmatic hierarchy with a plurality of programmatic layers, and/or a view hierarchy.

Figure 3B:
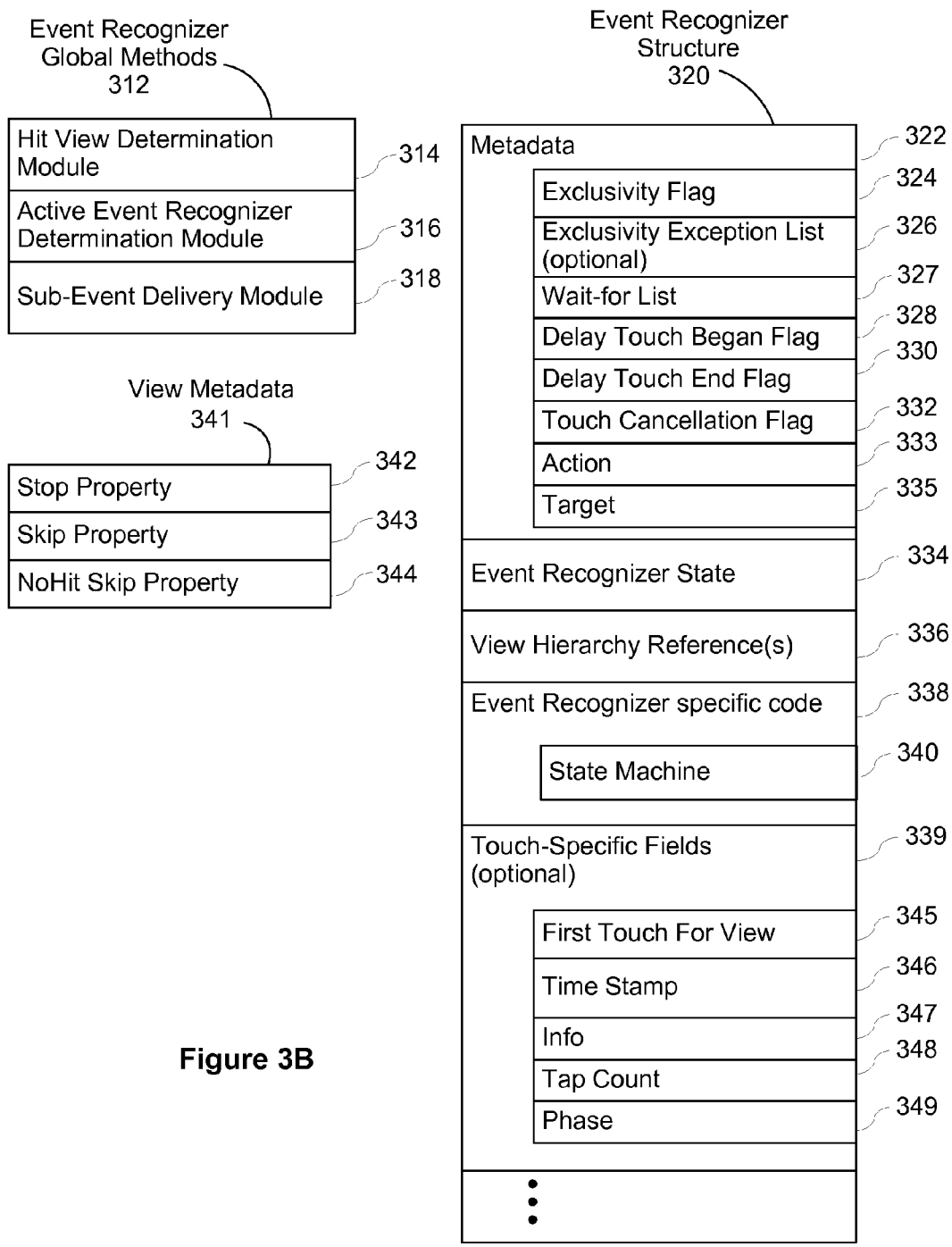
FIGS. 3B and 3C are block diagrams illustrating exemplary event recognizer methods and data structures, according to some embodiments.
Figure 3C:
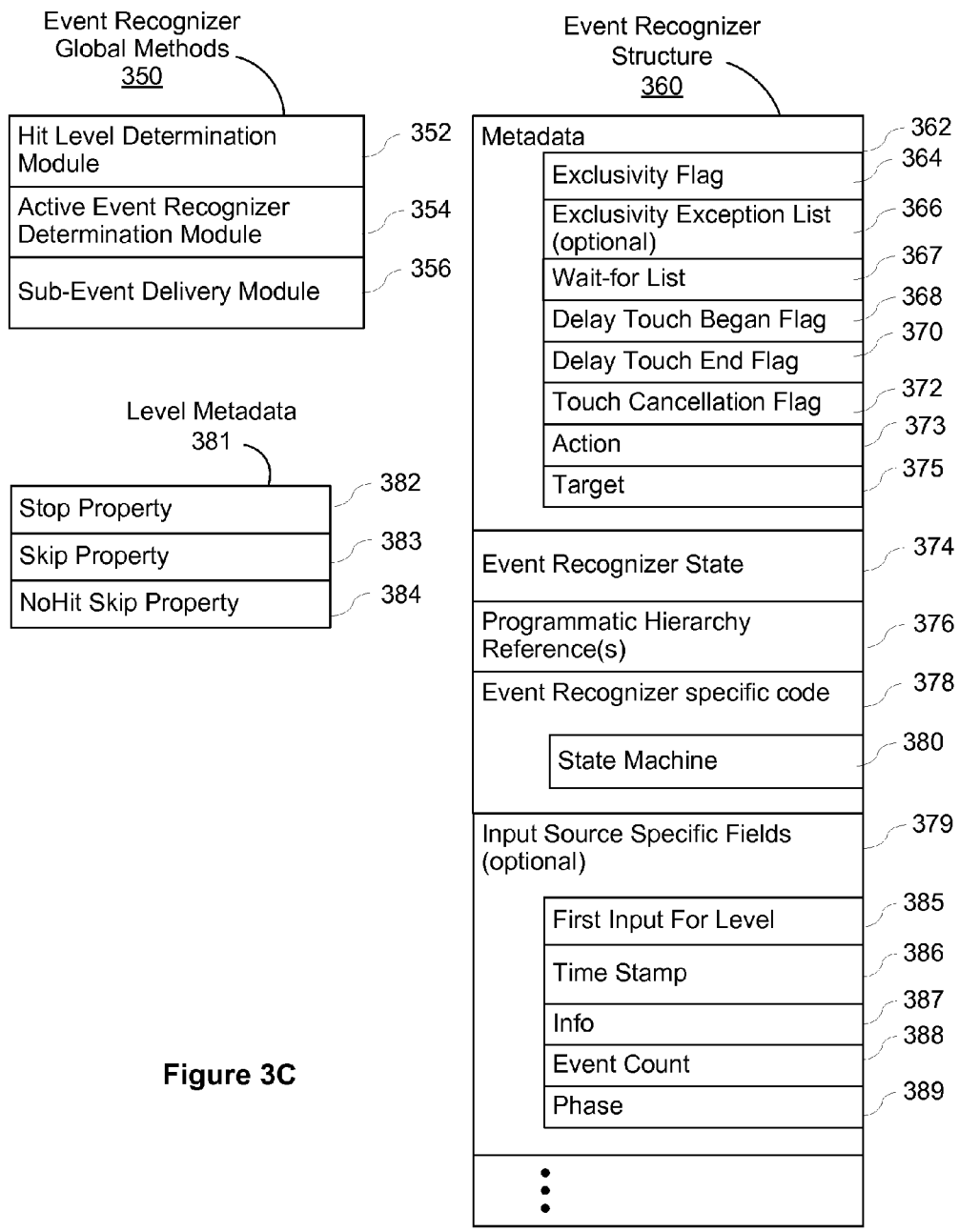

FIGS. 3B and 3C depict exemplary methods and structures related to event recognizers. FIG. 3B depicts methods and data structures for event handling when event handlers are associated with particular views within a hierarchy of views.

FIG. 3C depicts methods and data structures for event handling when event handlers are associated with particular levels within a hierarchy of programmatic levels. Event recognizer global methods 312 and 350 include hit view and hit level determination modules 314 and 352, respectively, active event recognizer determination modules 316 and 354, and sub-event delivery modules 318 and 356.

Hit view and hit level determination modules, 314 and 352, respectively, provide software procedures for determining where a sub-event has taken place within one or more views, e.g., the exemplary view hierarchy 300 depicted in FIG. 3A, which has three main branches.

The hit view determination module 314 of FIG. 3B, receives information related to a sub-event, e.g., a user touch represented as 301-1 on the outermost view 302, on a search result (map view 305) and the search results panel view 304. The hit view determination module 314 identifies a hit-view as the lowest view in the hierarchy which should handle the sub-event. In most circumstances, the hit view is the lowest level view in which an initiating sub-event (i.e., the first sub-event in the sequence of sub-events that form an event or potential event) occurs. Once the hit-view is identified, it will receive all sub-events related to the same touch or input source for which the hit view was identified.

In some embodiments, the hit level determination module 352 of FIG. 3C may utilize an analogous process.

Active event recognizer determination modules 316 and 354 of event recognizer global methods 312 and 350, respectively, determine which view or views within a view hierarchy should receive a particular sequence of sub-events. FIG. 3A depicts an exemplary set of active views, 302, 304 and 305, that receive the sub-event 301. In the example of FIG. 3A, the active event recognizer determination module 304 would determine that the top level view 302, search results panel 304 and maps view 305 are actively involved views because these views include the physical location of the touch represented by sub-event 301. It is noted that even if touch sub-event 301 were entirely confined to the area associated with map view 305, search results panel 304 and top level view 302 would still remain in the actively involved views since the search results panel 304 and the top level view 302 are ancestors of map view 305.

In some embodiments, active event recognizer determination modules 316 and 354 utilize analogous processes.

Sub-event delivery module 318 delivers sub-events to event recognizers for actively involved views. Using the example of FIG. 3A, a user's touch is represented in different views of the hierarchy by touch marks 301-1, 301-2, and 301-3. In some embodiments, sub-event data representing this user's touch is delivered by the sub-event delivery module 318 to event recognizers at the actively involved views, i.e., top level view 302, search results panel 304 and maps view 305. Further, the event recognizers of a view can receive subsequent sub-events of an event that starts within the view (e.g., when an initial sub-event occurs within the view). Stated in another way, a view can receive sub-events associated with user interactions beginning in the view, even if it continues outside of the view.

In some embodiments, sub-event delivery module 356 delivers sub-events to event recognizers for actively involved programmatic levels in a process analogous to that used by sub-event delivery module 318.

In some embodiments, a separate event recognizer structure 320 or 360 is generated and stored in memory of the device for each actively involved event recognizer. Event recognizer structures 320 and 360 typically include an event recognizer state 334, 374, respectively (discussed in greater detail below when referring to FIGS. 4A and 4B), and event recognizer specific code 338, 378, respectively, having state machines 340, 380, respectively. Event recognizer structure 320 also includes a view hierarchy reference 336, while event recognizer structure 360 includes a programmatic hierarchy reference 376. Each instance of a particular event recognizer references exactly one view or programmatic level. View hierarchy reference 336 or programmatic hierarchy reference 376 (for a particular event recognizer) are used to establish which view or programmatic level is logically coupled to the respective event recognizer.

View metadata 341 and level metadata 381 may include data regarding a view or level, respectively. View or level metadata may include at least the following properties that may influence sub-event delivery to event recognizers:

A stop property 342, 382, which, when set for a view or programmatic level prevents sub-event delivery to event recognizers associated with the view or programmatic level as well as its ancestors in the view or programmatic hierarchy.

A skip property 343, 383, which, when set for a view or programmatic level prevents sub-event delivery to event recognizers associated with that view or programmatic level, but permits sub-event delivery to its ancestors in the view or programmatic hierarchy.

A NoHit skip property 344, 384, which, when set for a view, prevents delivery of sub-events to event recognizers associated with the view unless the view is the hit view. As discussed above, the hit view determination module 314 identifies a hit-view (or hit-level in the case of hit-level determination module 352) as the lowest view in the hierarchy which should handle the sub-event.

Event recognizer structures 320 and 360 may include metadata 322, 362, respectively. In some embodiments, the metadata 322, 362 includes configurable properties, flags, and lists that indicate how the event delivery system should perform sub-event delivery to actively involved event recognizers. In some embodiments, metadata 322, 362 may include configurable properties, flags, and lists that indicate how event recognizers may interact with one another. In some embodiments, metadata 322, 362 may include configurable properties, flags, and lists that indicate whether sub-events are delivered to varying levels in the view or programmatic hierarchy. In some embodiments, the combination of event recognizer metadata 322, 362 and view or level metadata (341, 381, respectively) are both be used to configure the event delivery system to: a) perform sub-event delivery to actively involved event recognizers, b) indicate how event recognizers may interact with one another, and c) indicate whether and when sub-events are delivered to various levels in the view or programmatic hierarchy.

It is noted that, in some embodiments, a respective event recognizer sends an event recognition action 333, 373 to its respective target 335, 375, as specified by fields of the event recognizer's structure 320, 360. Sending an action to a target is distinct from sending (and deferred sending) sub-events to a respective hit view or level.

The metadata properties stored in a respective event recognizer structure 320, 360 of a corresponding event recognizer includes at least:

An exclusivity flag 324, 364, which, when set for an event recognizer, indicates that upon recognition of an event by the event recognizer, the event delivery system should stop delivering sub-events to any other event recognizers of the actively involved views or programmatic levels (with the exception of any other event recognizers listed in an exception list 326, 366). When receipt of a sub-event causes a particular event recognizer to enter the exclusive state, as indicated by its corresponding exclusivity flag 324 or 364, then subsequent sub-events are delivered only to the event recognizer in the exclusive state (as well as any other event recognizers listed in an exception list 326, 366).

Some event recognizer structures 320, 360, may include an exclusivity exception list 326, 366. When included in the event recognizer structure 320, 360 for a respective event recognizer, this list 326, 366 indicates the set of event recognizers, if any, that are to continue receiving sub-events even after the respective event recognizer has entered the exclusive state. For example, if the event recognizer for a single tap event enters the exclusive state, and the currently involved views include an event recognizer for a double tap event, then the list 320, 360 would list the double tap event recognizer so that a double tap event can be recognized even after a single tap event has been detected. Accordingly, the exclusivity exception list 326, 366 permits event recognizers to recognize different events that share common sequences of sub-events, e.g., a single tap event recognition does not preclude subsequent recognition of a double or triple tap event by other event recognizers.

Some event recognizer structures 320, 360, may include a wait-for list 327, 367. When included in the event recognizer structure 320, 360 for a respective event recognizer, this list 327, 367 indicates the set of event recognizers, if any, that must enter the event impossible or event canceled state before the respective event recognizer can recognize a respective event. In effect, the listed event recognizers have higher priority for recognizing an event than the event recognizer with the wait-for list 327, 367.

A delay touch began flag 328, 368, which, when set for an event recognizer, causes the event recognizer to delay sending sub-events (including a touch begin or finger down sub-event, and subsequent events) to the event recognizer's respective hit view or level until after it has been determined that the sequence of sub-events does not correspond to this event recognizer's event type. This flag can be used to prevent the hit view or level from ever seeing any of the sub-events in the case where the gesture is recognized. When the event recognizer fails to recognize an event, the touch began sub-event (and subsequent touch end sub-event) can be delivered to the hit view or level. In one example, delivering such sub-events to the hit view or level causes the user interface to briefly highlight an object, without invoking the action associated with that object.

A delay touch end flag 330, 370, which, when set for an event recognizer, causes the event recognizer to delay sending a sub-event (e.g., a touch end sub-event) to the event recognizer's respective hit view or level until it has been determined that the sequence of sub-events does not correspond to this event recognizer's event type. This can be used to prevent the hit view or level from acting upon a touch end sub-event, in case the gesture is late recognized. As long as the touch end sub-event is not sent, a touch canceled can be sent to the hit view or level. If an event is recognized, the corresponding action by an application is preformed, and the touch end sub-event is delivered to the hit view or level.

A touch cancellation flag 332, 372, which, when set for an event recognizer, causes the event recognizer to send touch or input cancellation to the event recognizer's respective hit view or hit level when it has been determined that the sequence of sub-events does not correspond to this event recognizer's event type. The touch or input cancellation sent to the hit view or level indicates that a prior sub-event (e.g., a touch began sub-event) has been cancelled. The touch or input cancellation may cause the input source handler's state (see FIG. 4B) to enter the input sequence cancelled state 460 (discussed below).

In some embodiments, the exception list 326, 366 can also be used by non-exclusive event recognizers. In particular, when a non-exclusive event recognizer recognizes an event, subsequent sub-events are not delivered to the exclusive event recognizers associated with the currently active views, except for those exclusive event recognizers listed in the exception list 326, 366 of the event recognizer that recognized the event.

In some embodiments, event recognizers may be configured to utilize the touch cancellation flag in conjunction with the delay touch end flag to prevent unwanted sub-events from being delivered to the hit view. For example, the definition of a single tap gesture and the first half of a double tap gesture are identical. Once a single tap event recognizer successfully recognizes a single tap, an undesired action could take place. If the delay touch end flag is set, the single tap event recognizer is prevented from sending sub-events to the hit view until a single tap event is recognized. In addition, the wait-for list of the single tap event recognizer may identify the double-tap event recognizer, thereby preventing the single tap event recognizer from recognizing a single tap until the double-tap event recognizer has entered the event impossible state. The use of the wait-for list avoids the execution of actions associated with a single tap when a double tap gesture is performed. Instead, only actions associated with a double tap will be executed, in response to recognition of the double tap event.

Turning in particular to forms of user touches on touch-sensitive surfaces, as noted above, touches and user gestures may include an act that need not be instantaneous, e.g., a touch can include an act of moving or holding a finger against a display for a period of time. A touch data structure, however, defines the state of a touch (or, more generally, the state of any input source) at a particular time. Therefore, the values stored in a touch data structure may change over the course of a single touch, enabling the state of the single touch at different points in time to be conveyed to an application.

Each touch data structure can comprise various fields. In some embodiments, touch data structures may include data corresponding to at least the touch-specific fields 339 in FIG. 3B or input source specific fields 379 in FIG. 3C.

For example, a "first touch for view" field 345 in FIG. 3B (385 for "first touch for level" in FIG. 3C) can indicate whether the touch data structure defines the first touch for the particular view (since the software element implementing the view was instantiated). A "time stamp" field 346, 386 can indicate the particular time to which the touch data structure relates.

Optionally, an "info" field 347, 387 can be used to indicate if a touch is a rudimentary gesture. For example, the "info" field 347, 387 can indicate whether the touch is a swipe and, if so, in which direction the swipe is oriented. A swipe is a quick drag of one or more fingers in a straight direction. API implementations (discussed below) can determine if a touch is a swipe and pass that information to the application through the "info" field 347, 387, thus alleviating the application of some data processing that would have been necessary if the touch were a swipe.

Optionally, a "tap count" field 348 in FIG. 3B ("event count" field 388 in FIG. 3C) can indicate how many taps have been sequentially performed at the position of the initial touch. A tap can be defined as a quick pressing and lifting of a finger against a touch-sensitive panel at a particular position. Multiple sequential taps can occur if the finger is again pressed and released in quick succession at the same position of the panel. An event delivery system 124 can count taps and relay this information to an application through the "tap count" field 348. Multiple taps at the same location are sometimes considered to be a useful and easy to remember command for touch enabled interfaces. Thus, by counting taps, the event delivery system 124 can again alleviate some data processing from the application.

A "phase" field 349, 389 can indicate a particular phase the touch-based gesture is currently in. The phase field 349, 389 can have various values, such as "touch phase began" which can indicate that the touch data structure defines a new touch that has not been referenced by previous touch data structures. A "touch phase moved" value can indicate that the touch being defined has moved from a prior position. A "touch phase stationary" value can indicate that the touch has stayed in the same position. A "touch phase ended" value can indicate that the touch has ended (e.g., the user has lifted his/her finger from the surface of a multi touch display). A "touch phase cancelled" value can indicate that the touch has been cancelled by the device. A cancelled touch can be a touch that is not necessarily ended by a user, but which the device has determined to ignore. For example, the device can determine that the touch is being generated inadvertently (i.e., as a result of placing a portable multi touch enabled device in one's pocket) and ignore the touch for that reason. Each value of the "phase field" 349, 389 can be a integer number.

Thus, each touch data structure can define what is happening with a touch (or other input source) at a particular time (e.g., whether the touch is stationary, being moved, etc.) as well as other information associated with the touch (such as position). Accordingly, each touch data structure can define the state of a particular touch at a particular moment in time. One or more touch data structures referencing the same time can be added in a touch event data structure that can define the states of all touches a particular view is receiving at a moment in time (as noted above, some touch data structures may also reference touches that have ended and are no longer being received). Multiple touch event data structures can be sent to the software implementing a view as time passes, in order to provide the software with continuous information describing the touches that are happening in the view.

The ability to handle complex touch-based gestures, optionally including multi-touch gestures, can add complexity to the various software elements. In some cases, such additional complexity can be necessary to implement advanced and desirable interface features. For example, a game may require the ability to handle multiple simultaneous touches that occur in different views, as games often require the pressing of multiple buttons at the same time, or combining accelerometer data with touches on a touch-sensitive surface. However, some simpler applications and/or views (and their associated software elements) need not require advanced interface features. For example, a simple soft button (i.e., a button that is displayed on a touch-sensitive display) may operate satisfactorily with single touches, rather than multi-touch functionality. In these cases, the underlying OS may send unnecessary or excessive touch data (e.g., multi-touch data) to a software element associated with a view that is intended to be operable by single touches only (e.g., a single touch or tap on a soft button). Because the software element may need to process this data, it may need to feature all the complexity of a software element that handles multiple touches, even though it is associated with a view for which only single touches are relevant. This can increase the cost of development of software for the device, because software elements that have been traditionally easy to program in a mouse interface environment (i.e., various buttons, etc.) may be much more complex in a multi-touch environment.

It shall be understood, however, that the foregoing discussion regarding the complexity of evaluating and processing user touches on touch-sensitive surfaces also applies to all forms of user inputs to operate electronic devices 102 and 104 with input-devices, 128 and 158, respectively, not all of which are initiated on touch screens, e.g., coordinating mouse movement and mouse button presses with or without single or multiple keyboard presses or holds, user movements taps, drags, scrolls, etc., on touch-pads, pen stylus inputs, oral instructions, detected eye movements, biometric inputs, detected physiological change in a user, and/or any combination thereof, which may be utilized as inputs corresponding to sub-events which define an event to be recognized.

Figure 4A:
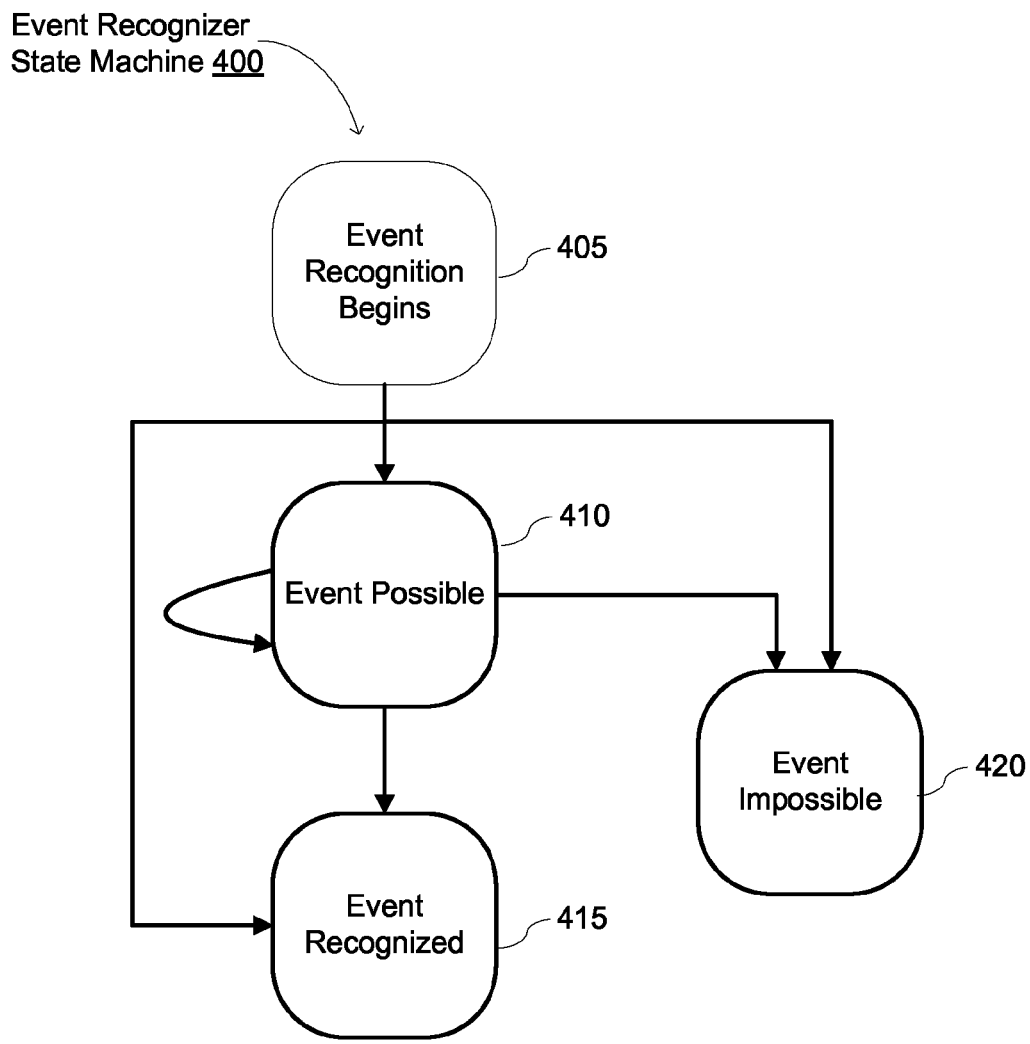
FIGS. 4A and 4B are flow charts illustrating exemplary state machines, according to some embodiments.

FIG. 4A depicts an event recognizer state machine 400 containing four states. By managing state transitions in event recognizer state machine 400 based on received sub-events, an event recognizer effectively expresses an event definition. For example, a tap gesture may be effectively defined by a sequence of two, or optionally, three sub-events. First, a touch should be detected, and this will be sub-event 1. For example, the touch sub-event may be a user's finger touching a touch-sensitive surface in a view that includes the event recognizer having state machine 400. Second, an optional measured delay where the touch does not substantially move in any given direction (e.g., any movement of the touch position is less than a predefined threshold, which may be measured as a distance (e.g., 5 mm) or as a number of pixels (e.g., 5 pixels) on the display), and the delay is sufficiently short, would serve as sub-event 2. Finally, termination of the touch (e.g., liftoff of the user's finger from the touch-sensitive surface) will serve as sub-event 3. By coding the event recognizer state machine 400 to transition between states based upon receiving these sub-events, the event recognizer state machine 400 effectively expresses a tap gesture event definition.

Regardless of event type, the event recognizer state machine 400 begins in an event recognition begins state 405, and may progress to any of the remaining states depending on what sub-event is received. To facilitate discussion of the event recognizer state machine 400, the direct paths from the event recognition begins state 405 to the event recognized state 415, the event possible state 410, and event impossible state 420 will be discussed, followed by a description of the paths leading from the event possible state 410.

Starting from event recognition begins state 405, if a sub-event is received that, by itself comprises the event definition for an event, the event recognizer state machine 400 will transition to event recognized state 415.

Starting from state event recognition begins 405, if a sub-event is received that is not the first sub-event in an event definition, the event recognizer state machine 400 will transition to event impossible state 420.

Starting from event recognition begins state 405, if a sub-event is received that is the first and not final sub-event in a given event definition, the event recognizer state machine 400 will transition to event possible state 410. If the next sub-event received is a second sub-event, but not the final sub-event in the given event definition, the event recognizer state machine 400 will remain in state event possible 410. The event recognizer state machine 400 can remain in state event possible 410 for as long as the sequence of received sub-events continues to be part of the event definition. If, at any time the event recognizer state machine 400 is in event possible state 410, and the event recognizer state machine 400 receives a sub-event that is not part of the event definition, it will transition to state event impossible 420, thereby determining that the current event (if any) is not the type of event that corresponds to this event recognizer (i.e., the event recognizer corresponding to state 400). If, on the other hand, the event recognizer state machine 400 is in the event possible state 410, and the event recognizer state machine 400 receives the last sub-event in an event definition, it will transition to the event recognized state 415, thereby completing a successful event recognition.

Figure 4B:
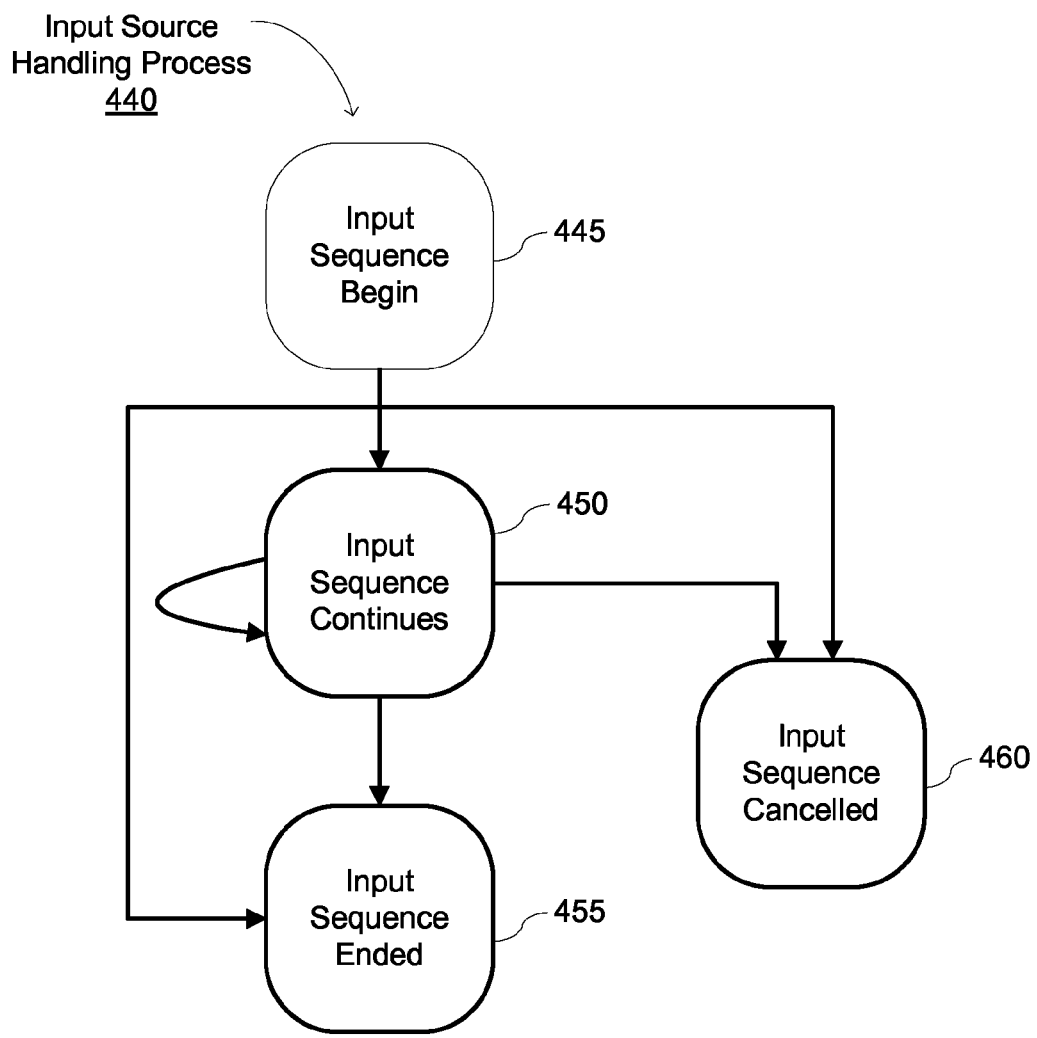

FIG. 4B depicts an embodiment of an input source handling process 440, having a finite state machine representing how views receive information about a respective input. It is noted that when there are multiple touches on the touch-sensitive surface of a device, each of the touches is a separate input source having its own finite state machine. In this embodiment, input source handling process 440 includes four states: input sequence begin 445, input sequence continues 450, input sequence ended 455, and input sequence cancelled 460. Input source handling process 440 may be used by a respective event recognizer, for example, when input is to be delivered to an application, but only after the completion of an input sequence is detected. Input source handling process 440 can be used with an application that is incapable of canceling or undoing changes made in response to an input sequence delivered to the application.

Starting from input sequence begin 445, if an input is received that, by itself completes an input sequence, input source handling process 440 will transition to input sequence ended 455.

Starting from input sequence begin 445, if an input is received that indicates the input sequence terminated, input source handling process 440 will transition to input sequence cancelled 460.

Starting from input sequence begin 445, if an input is received that is the first and not final input in a input sequence, input source handling process 440 will transition to state input sequence continues 450. If the next input received is the second input in an input sequence, the input handling process 440 will remain in state input sequence continues 450. Input source handling process 440 can remain in state input sequence continues 450 for as long as the sequence of sub-events being delivered continue to be part of a given input sequence. If, at any time input source handling process 440 is in state input sequence continues 450, and input source handling process 440 receives an input that is not part of the input sequence, it will transition to state input sequence cancelled 460. If, on the other hand, input source handling process 440 is in input sequence continues 450, and the input handling process 440 receives the last input in a given input definition, it will transition to the input sequence ended 455, thereby successfully receiving a group of sub-events.

In some embodiments, input source handling process 440 may be implemented for particular views or programmatic levels. In that case, certain sequences of sub-events may result in transitioning to state input cancelled 460.

Figure 4C:
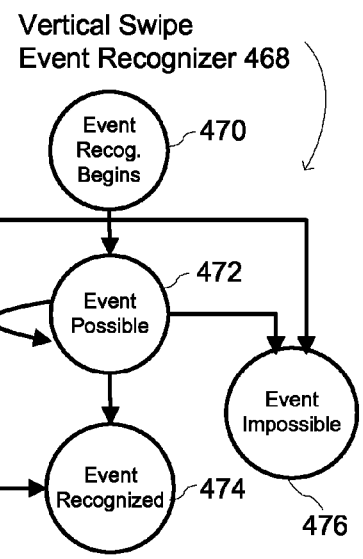
FIG. 4C illustrates the exemplary state machines of FIGS. 4A and 4B to an exemplary set of sub-events, according to some embodiments.
Figure 4C:
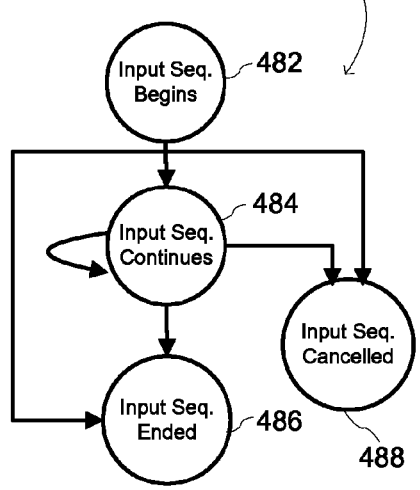

As an example, consider FIG. 4C, which supposes an actively involved view, represented only by actively involved view input source handler 480 (hereafter "view 480"). View 480 includes a vertical swipe event recognizer, represented only by vertical swipe event recognizer 468 (hereafter "recognizer 468") as one of its event recognizers. In this case, the recognizer 468 may require as part of its definition detecting: 1) a finger down 465-1; 2) an optional short delay 465-2; 3), vertical swiping of at least N pixels 465-3; and 4) a finger liftoff 465-4.

For this example, the recognizer 468 also has its delay touch began flag 328 and touch cancellation flag 332 set. Now consider delivery of the following sequence of sub-events to recognizer 468, as well as the view 480:

sub-event sequence 465-1: detect finger down, which corresponds to recognizer 468's event definition sub-event sequence 465-2: measure delay, which corresponds to recognizer 468's event definition sub-event sequence 465-3: finger performs a vertical swiping movement compatible with vertical scrolling, but is less than N pixels, and therefore does not correspond to recognizer 468's event definition sub-event sequence 465-4: detect finger liftoff, which corresponds to recognizer 468's event definition Here, recognizer 468 would successfully recognize sub-events 1 and 2 as part of its event definition, and accordingly, would be in state event possible 472 immediately prior to the delivery of sub-event 3. Since recognizer 468 has its delay touch began flag 328 set, the initial touch sub-event is not sent to the hit view. Correspondingly, the view 480's input source handling process 440 would still be in state input sequence begin immediately prior to the delivery of sub-event 3.

Once delivery of sub-event 3 to recognizer 468 is complete, recognizer 468's state transitions to event impossible 476, and importantly, the recognizer 468 has now determined that the sequence of sub-events does not correspond to its specific vertical swipe gesture event type (i.e., it has decided the event is not a vertical swipe. In other words, recognition 474 as a vertical swipe does not occur in this example.). The input source handling system 440 for view input source handler 480 will also update its state. In some embodiments, the state of the view input source handler 480 would proceed from the input sequence begins state 482 to the input sequence continues state 484 when the event recognizer sends status information indicating that it has begun recognizing an event. The view input source handler 480 proceeds to the input sequence cancelled state 488 when the touch or input ends without an event being recognized because the touch cancellation flag 322 of the event recognizer has been set. Alternately, if the touch cancellation flag 322 of the event recognizer had not been set, the view input source handler 480 proceeds to the input sequence ended state 486 when the touch of input ends.

Since event recognizer 468's touch cancellation flag 332 is set, when the event recognizer 468 transitions to the event impossible state 476, the recognizer will send a touch cancellation sub-event or message to the hit view corresponding to the event recognizer. As a result, the view input source handler 480 will transition to the state input sequence cancelled 488.

In some embodiments, delivery of sub-event 465-4 is not germane to any event recognition decisions made by recognizer 468, though view input source handler 480's other event recognizers, if any, may continue to analyze the sequence of sub-events.

The following table presents in summarized tabular format the processing of this exemplary sub-event sequence 465 as related to the state of event recognizer 468 described above, along with the state of view input source handler 480. In this example, the state of the view input source handler 480 proceeds from input sequence begin 445 to input sequence cancelled 488 because recognizer 468's touch cancellation flag 332 was set:

| Sub-Event Sequence 465 | State: Recognizer 468 | State: View 480 |
| --- | --- | --- |
| before delivery starts | Event Recognition Begins 470 | |
| detect finger down 465-1 | Event Possible 472 | Input Sequence Begins 482 |
| measure delay 465-2 | Event Possible 472 | Input Sequence Continues 484 |
| detect finger vertical swipe 465-3 | Event Impossible 476 | Input Sequence Continues 484 |
| detect finger liftoff 465-4 | Event Impossible 476 | Input Sequence Cancelled 488 |

Figure 5A:
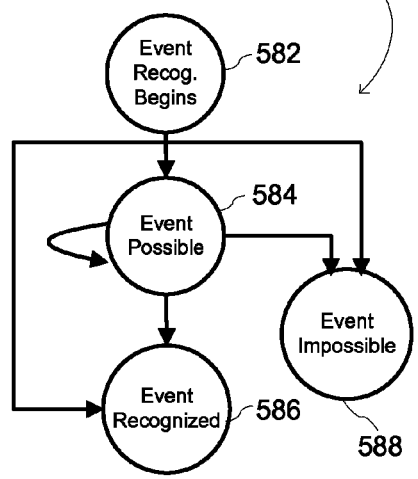
FIGS. 5A-5C illustrate exemplary sub-event sequences with exemplary event recognizer state machines, according to some embodiments.
Figure 5A:
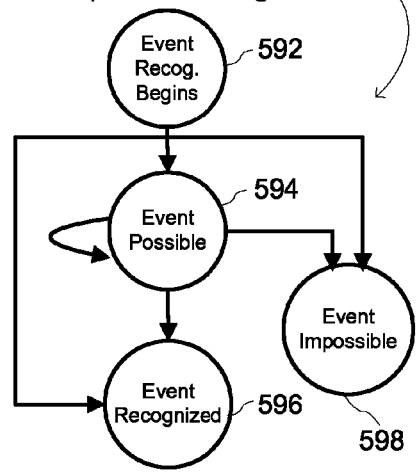

Turning to FIG. 5A, attention is directed to an example of a sub-event sequence 520, which is being received by a view that includes a plurality of event recognizers. For this example, two event recognizers are depicted in FIG. 5A, scrolling event recognizer 580 and tap event recognizer 590. For purposes of illustration, the view search results panel 304 in FIG. 3A will be related to the reception of the sub-event sequence 520, and the state transitions in scrolling event recognizer 580 and tap event recognizer 590. Note that in this example, the sequence of sub-events 520 defines a tap finger gesture on a touch-sensitive display or trackpad, but the same event recognition technique could be applied in myriad contexts, e.g., detecting a mouse button press, and/or in embodiments utilizing programmatic hierarchies of programmatic levels.

Before the first sub-event is delivered to view search results panel 304, event recognizers 580 and 590 are in the event recognition begins states 582 and 592, respectively. Following touch 301, which is delivered as sub-event detect finger down 521-1 to actively involved event recognizers for view search results panel 304 as touch sub-event 301-2 (as well as to actively involved event recognizers for map view 305 as touch sub-event 301-3), scrolling event recognizer 580 transitions to state event possible 584, and similarly, tap event recognizer 590 transitions to state event possible 594. This is because the event definition of a tap and a scroll both begin with a touch such as detecting a finger down on a touch-sensitive surface.

Some definitions of tap and scroll gestures may optionally include a delay between an initial touch and any next step in the event definition. In all examples discussed here, the exemplar event definitions for both tap and scroll gestures recognize a delay sub-event following the first touch sub-event (detect finger down).

Accordingly, as sub-event measure delay 521-2 is delivered to event recognizers 580 and 590, both remain in the event possible states 584 and 594, respectively.

Finally, sub-event detect finger liftoff 521-3 is delivered to event recognizers 580 and 590. In this case, the state transitions for event recognizers 580 and 590 are different, because the event definitions for tap and scroll are different. In the case of scrolling event recognizer 580, the next sub-event to remain in state event possible would be to detect movement. Since the sub-event delivered is detect finger liftoff 521-3, however, the scrolling event recognizer 580 transitions to state event impossible 588. A tap event definition concludes with a finger liftoff sub-event though. Accordingly, tap event recognizer 590 transitions to state event recognized 596 after sub-event detect finger liftoff 521-3 is delivered.

Note that in some embodiments, as discussed above with respect to FIGS. 4B and 4C, the input source handling process 440 discussed in FIG. 4B may be used for various purposes at the view level. The following table presents in summarized tabular format the delivery of sub-event sequence 520 as related to event recognizers 580, 590, and input source handling process 440:

| Sub-Event Sequence 520 | State: Scrolling Event Recognizer 580 | State: Tap Event Recognizer 590 | State: Input Source Handling Process 440 |
| --- | --- | --- | --- |
| before delivery starts | Event Recognition Begins 582 | Event Recognition Begins 592 | |
| Detect Finger Down 521-1 | Event Possible 584 | Event Possible 594 | Input Sequence Begin 445 |
| Measure Delay 521-2 | Event Possible 584 | Event Possible 594 | Input Sequence Continues 450 |
| Detect Finger Liftoff 521-3 | Event impossible 588 | Event Recognized 596 | Input Sequence Ended 455 |

Figure 5B:
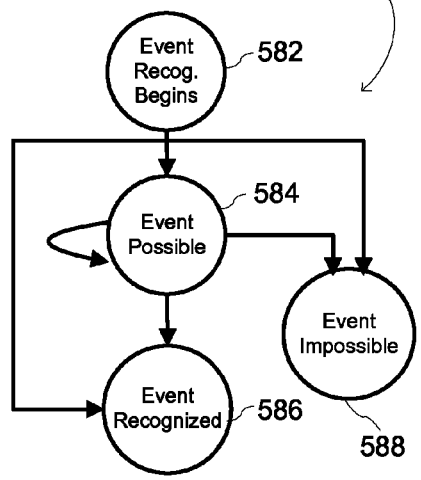
Figure 5B:
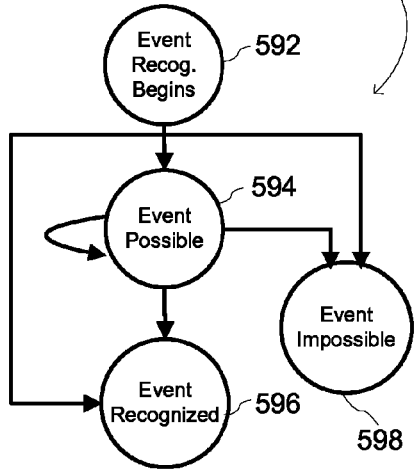

Turning to FIG. 5B, attention is directed to another example of a sub-event sequence 530, which is being received by a view that includes a plurality of event recognizers. For this example, two event recognizers are depicted in FIG. 5B, scrolling event recognizer 580 and tap event recognizer 590. For purposes of illustration, the view search results panel 304 in FIG. 3A will be related to the reception of the sub-event sequence 530, and the state transitions in scrolling event recognizer 580 and tap event recognizer 590. Note that in this example, the sequence of sub-events 530 defines a scroll finger gesture on a touch-sensitive display, but the same event recognition technique could be applied in myriad contexts, e.g., detecting a mouse button press, mouse movement, and mouse button release, and/or in embodiments utilizing programmatic hierarchies of programmatic levels.

Before the first sub-event is delivered to actively involved event recognizers for view search results panel 304, event recognizers 580 and 590 are in the event recognition begins states 582 and 592, respectively. Following delivery of sub-events corresponding to touch 301 (as discussed above), scrolling event recognizer 580 transitions to state event possible 584, and similarly, tap event recognizer 590 transitions to state event possible 594.

As sub-event measure delay 531-2 is delivered to event recognizers 580 and 590, both transition to the event possible states 584 and 594, respectively.

Next, sub-event detect finger movement 531-3 is delivered to event recognizers 580 and 590. In this case, the state transitions for event recognizers 580 and 590 are different because the event definitions for tap and scroll are different. In the case of scrolling event recognizer 580, the next sub-event to remain in state event possible is to detect movement, so the scrolling event recognizer 580 remains in the event possible state 584 when it receives sub-event detect finger movement 531-3. As discussed above, however, the definition for a tap concludes with a finger liftoff sub-event, so tap event recognizer 590 transitions to the state event impossible 598.

Finally, sub-event detect finger liftoff 531-4 is delivered to event recognizers 580 and 590. Tap event recognizer is already in the event impossible state 598, and no state transition occurs. Scrolling event recognizer 580's event definition concludes with detecting a finger liftoff. Since the sub-event delivered is detect finger liftoff 531-4, the scrolling event recognizer 580 transitions to state event recognized 586. It is noted that a finger movement on a touch sensitive surface may generate multiple movement sub-events, and therefore a scroll may be recognized before liftoff and continue until liftoff.

The following table presents in summarized tabular format the delivery of sub-event sequence 530 as related to event recognizers 580, 590, and input source handling process 440:

| Sub-Event Sequence 530 | State: Scrolling Event Recognizer 580 | State: Tap Event Recognizer 590 | State: Input Source Handling Process 440 |
|---|---|---|---|
| before delivery starts | Event Recognition Begins 582 | Event Recognition Begins 592 | |
| detect finger down 531-1 | Event Possible 584 | Event Possible 594 | Input Sequence Begins 445 |
| measure delay 531-2 | Event Possible 584 | Event Possible 594 | Input sequence continues 450 |
| detect finger movement 531-3 | Event Possible 584 | Event Impossible 598 | Input sequence continues 450 |
| detect finger liftoff 531-4 | Event Recognized 586 | Event Impossible 598 | Input sequence ended 455 |

Figure 5C:
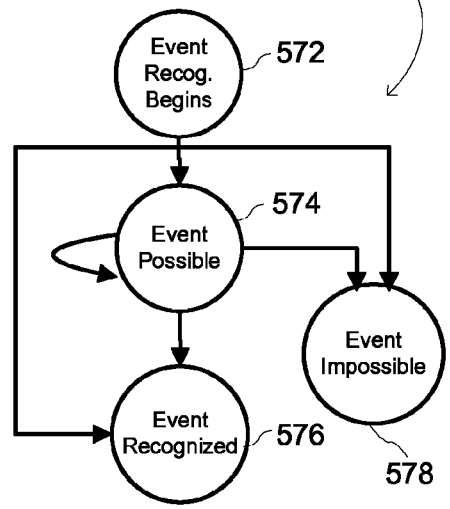
Figure 5C:
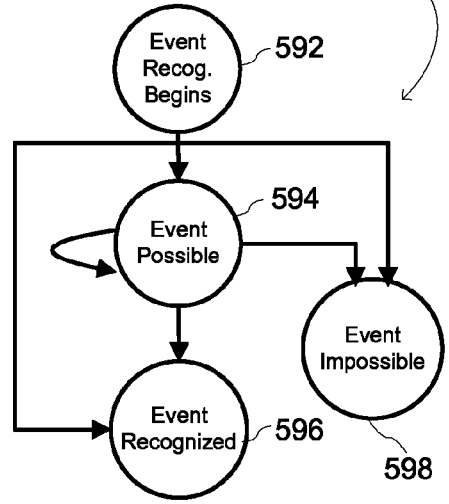

Turning to FIG. 5C, attention is directed to another example of a sub-event sequence 540, which is being received by a view that includes a plurality of event recognizers. For this example, two event recognizers are depicted in FIG. 5C, double tap event recognizer 570 and tap event recognizer 590. For purposes of illustration, the map view 305 in FIG. 3A will be related to the reception of the sub-event sequence 540, and the state transitions in double tap event recognizer 570 and tap event recognizer 590. Note that in this example, the sequence of sub-events 540 defines a double tap gesture on a touch-sensitive display, but the same event recognition technique could be applied in myriad contexts, e.g., detecting a mouse double click, and/or in embodiments utilizing programmatic hierarchies of programmatic levels.

Before the first sub-event is delivered to actively involved event recognizers for map view 305, event recognizers 570 and 590 are in the event recognition begins states 572 and 592, respectively. Following delivery of sub-events related to touch sub-event 301 to map view 304 (as described above), double tap event recognizer 570 and tap event recognizer 590 transition to states event possible 574 and 594, respectively. This is because the event definition of a tap and a double tap both begin with a touch such as detecting a finger down on a touch-sensitive surface.

As sub-event measure delay 541-2 is delivered to event recognizers 570 and 590, both remain in states event possible 574 and 594, respectively.

Next, sub-event detect finger liftoff 541-3 is delivered to event recognizers 570 and 590. In this case, the state transitions for event recognizers 580 and 590 are different because the exemplar event definitions for tap and double tap are different. In the case of tap event recognizer 590, the final sub-event in the event definition is to detect finger liftoff, so the tap event recognizer 590 transitions to the event recognized state 596.

Double tap recognizer 570 remains in state event possible 574, however, since a delay has begun, regardless of what the user may ultimately do. The complete event recognition definition for a double tap requires another delay, followed by a complete tap sub-event sequence though. This creates an ambiguous situation as between the tap event recognizer 590, which is already in state event recognized 576, and the double tap recognizer 570, which is still in state event possible 574.

Accordingly, in some embodiments, event recognizers may implement exclusivity flags and exclusivity exception lists as discussed above with respect to FIGS. 3B and 3C.

Here, the exclusivity flag 324 for tap event recognizer 590 would be set, and additionally, exclusivity exception list 326 for tap event recognizer 590 would be configured to continue permitting delivery of sub-events to some event recognizers (such as double tap event recognizer 570) after tap event recognizer 590 enters the state event recognized 596.

While tap event recognizer 590 remains in state event recognized 596, sub-event sequence 540 continues to be delivered to double tap event recognizer 570, where sub-events measure delay 541-4, detect finger down 541-5, and measure delay 541-6, keep the double tap event recognizer 570 in the state event possible 574; delivery of the final sub-event of sequence 540, detect finger liftoff 541-7 transitions double tap event recognizer 570 to state event recognized 576.

At this point, the map view 305 takes the event double tap as recognized by event recognizer 570, rather than the single tap event recognized by tap event recognizer 590. The decision to take the double tap event is made in light of the combination of the tap event recognizer 590's exclusivity flag 324 being set, the tap event recognizer 590's exclusivity exception list 326 including a double tap event, and the fact that both the tap event recognizer 590 and the double tap event recognizer 570 both successfully recognized their respective event types.

The following table presents in summarized tabular format the delivery of sub-event sequence 540 as related to event recognizers 570 and 590, and sub-event handling process 440:

| Sub-Event Sequence 540 | Stag: Double Tap Event Recognizer 570 | State: Tap Event Recognizes 590 | State: Input Source Handling Process 440 |
|---|---|---|---|
| before delivery starts | Event Recognition Begins 572 | Event Recognition Begins 592 | |
| detect finger down 541-1 | Event Possible 574 | Event Possible 594 | Input Sequence Begins 445 |
| measure delay 541-2 | Event Possible 574 | Event Possible 594 | Input sequence continues 450 |
| detect finger liftoff 541-3 | Event Possible 574 | Event Recognized 596 | Input sequence continues 450 |
| measure delay 541-4 | Event Possible 574 | Event Recognized 596 | Input sequence continues 450 |
| detect finger down 541-5 | Event Possible 574 | Event Recognized 596 | Input sequence continues 450 |
| measure delay 541-6 | Event Possible 574 | Event Recognized 596 | Input sequence continues 450 |
| detect finger liftoff 541-7 | Event Recognized 576 | Event Recognized 596 | Input sequence ended 455 |

In another embodiment, in the event scenario of FIG. 5C, the single tap gesture is not recognized, because the single tap event recognizer has a wait-for list that identifies the double tap event recognizer. As a result, a single tap gesture is not recognized until (if ever) the double tap event recognizer enters the event impossible state. In this example, in which a double tap gesture is recognized, the single tap event recognizer would remain in the event possible state until the double tap gesture is recognized, at which point the single tap event recognizer would transition to the event impossible state.

Figure 6A:
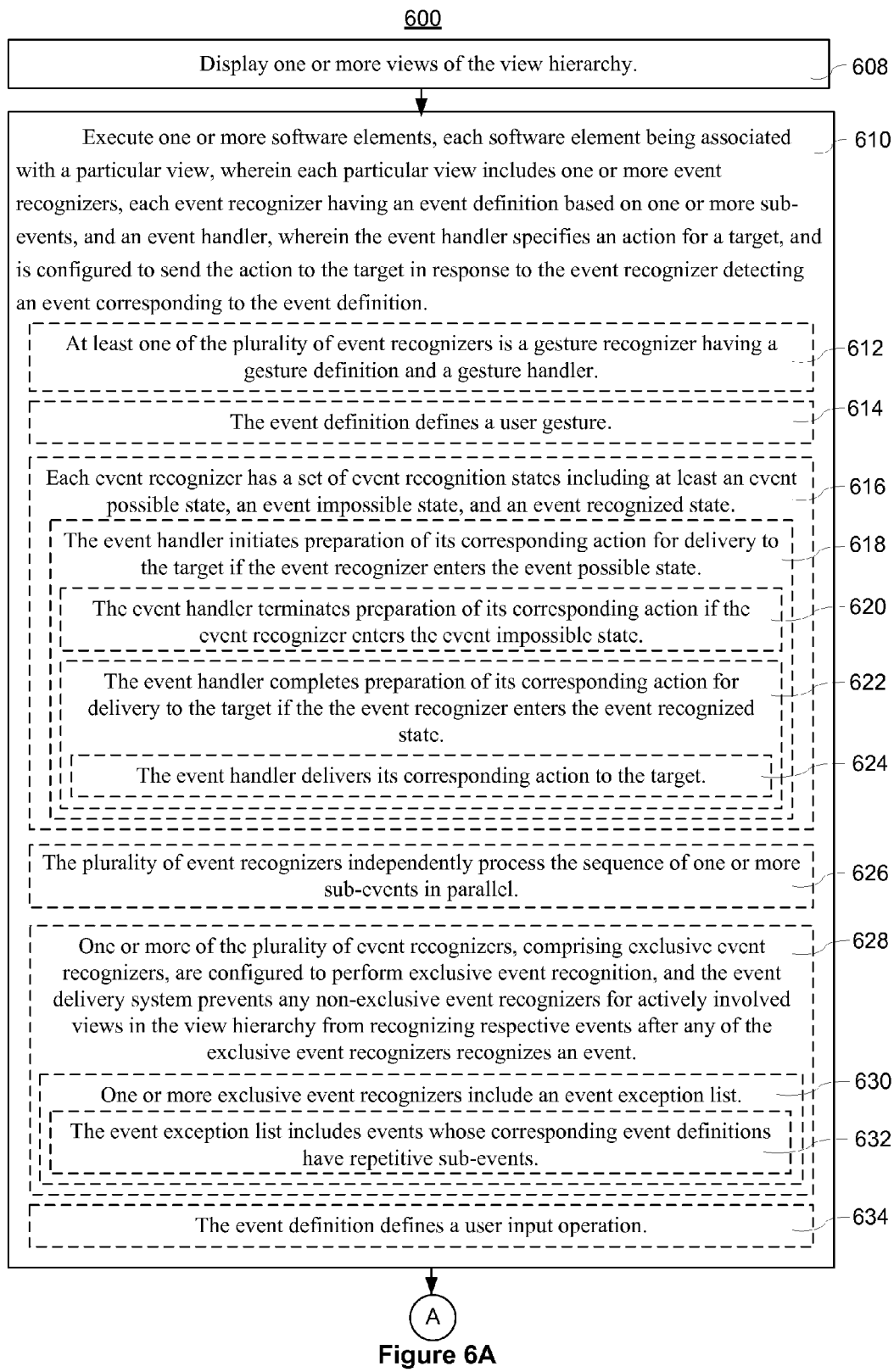
FIGS. 6A and 6B are event recognition method flow diagrams, according to some embodiments.
Figure 6B:
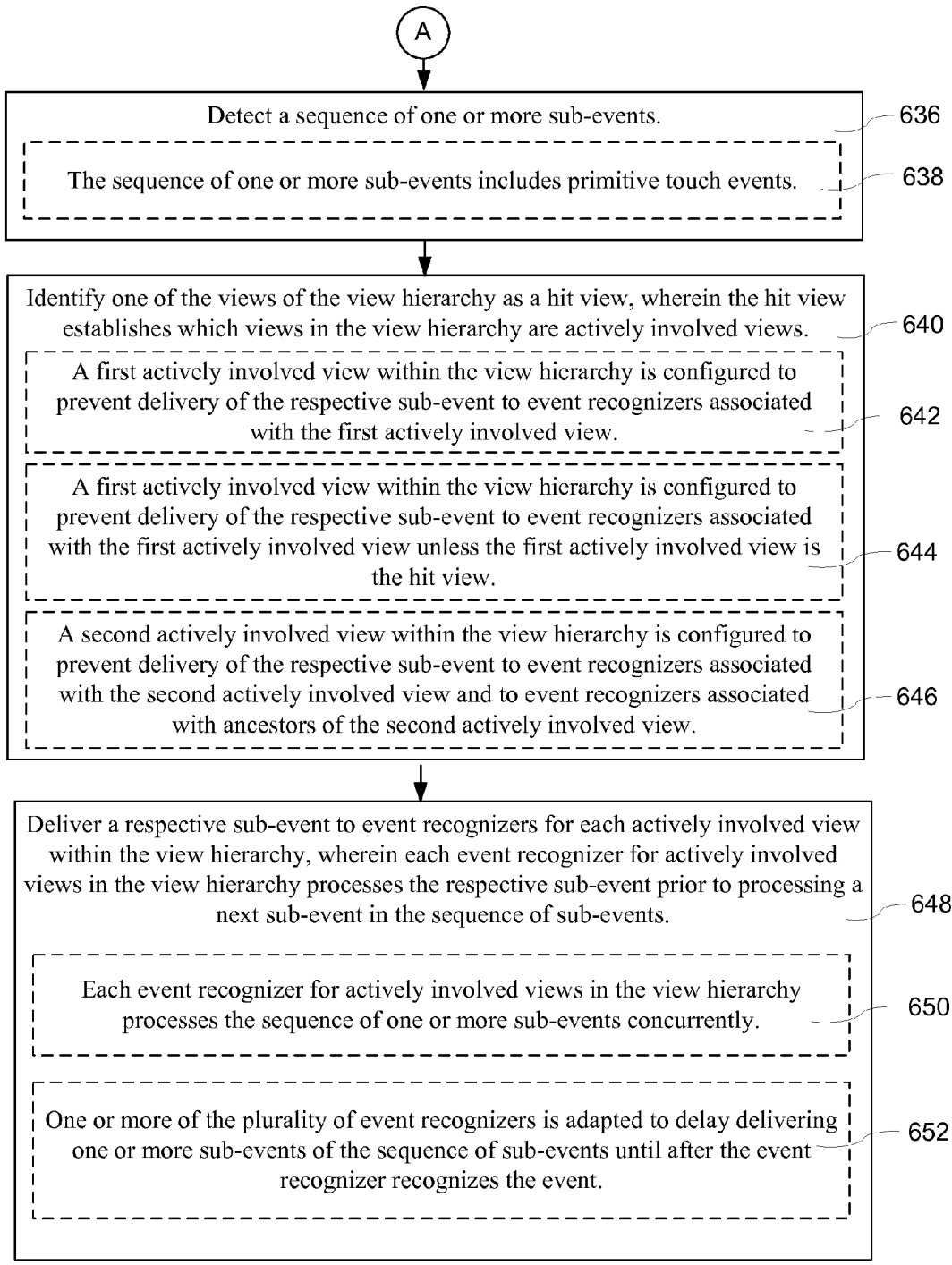

Attention is now directed to FIGS. 6A and 6B, which are flow diagrams illustrating an event recognition method in accordance with some embodiments. The method 600 is performed at an electronic device, which in some embodiments, may be an electronic device 102 or 104, as discussed above. In some embodiments, the electronic device may include a touch sensitive surface configured to detect multi-touch gestures. Alternatively, the electronic device may include a touch screen configured to detect multi-touch gestures.

The method 600 is configured to execute software that includes a view hierarchy with a plurality of views. The method 600 displays 608 one or more views of the view hierarchy, and executes 610 one or more software elements. Each software element is associated with a particular view, and each particular view includes one or more event recognizers, such as those described in FIGS. 3B and 3C as event recognizer structures 320 and 360, respectively.

Each event recognizer generally includes an event definition based on one or more sub-events, where the event definition may be implemented as a state machine, see e.g., FIG. 3B state machine 340. Event recognizers also generally include an event handler, which specifies an action for a target, and is configured to send the action to the target in response to the event recognizer detecting an event corresponding to the event definition.

In some embodiments, at least one of the plurality of event recognizers is a gesture recognizer having a gesture definition and a gesture handler as noted in step 612 of FIG. 6A.

In some embodiments, the event definition defines a user gesture as noted in step 614 of FIG. 6A.

Alternatively, event recognizers have a set of event recognition states 616. These event recognition states may include at least an event possible state, an event impossible state, and an event recognized state.

In some embodiments, the event handler initiates preparation 618 of its corresponding action for delivery to the target if the event recognizer enters the event possible state. As discussed above with respect to FIG. 4A and the examples in FIGS. 5A-5C, the state machines implemented for each event recognizer generally include an initial state, e.g., state event recognition begins 405. Receiving a sub-event that forms the initial part of an event definition triggers a state change to the event possible state 410. Accordingly, in some embodiments, as an event recognizer transitions from the state event recognition begins 405 to the state event possible 410, the event recognizer's event handler may begin preparing its particular action to deliver to the event recognizer's target after an event is successfully recognized.

On the other hand, in some embodiments, the event handler may terminate preparation 620 of its corresponding action if the event recognizer enters the state event impossible 420. In some embodiments, terminating the corresponding action includes canceling any preparation of the event handler's corresponding action.

The example of FIG. 5B is informative for this embodiment since tap event recognizer 590 may have initiated preparation 618 of its action, but then, once the sub-event detect finger movement 531-3 is delivered to the tap event recognizer 590, the recognizer 590 will transition to the event impossible state 598, 578. At that point, tap event recognizer 590 may terminate preparation 620 of the action for which it had initiated preparation 618.

In some embodiments, the event handler completes preparation 622 of its corresponding action for delivery to the target if the event recognizer enters the event recognized state. The example of FIG. 5C illustrates this embodiment since a double tap is recognized by actively involved event recognizers for the map view 305, which in some implementations, would be the event bound to selecting and/or executing the search result depicted by map view 305. Here, after the double tap event recognizer 570 successfully recognizes the double tap event comprised of the sub-event sequence 540, map view 305's event handler completes preparation 622 of its action, namely, indicating that it has received an activation command.

In some embodiments, the event handler delivers 624 its corresponding action to the target associated with the event recognizer. Continuing with the example of FIG. 5C, the action prepared, i.e. the activation command of the map view 305, would be delivered to the specific target associated with the map view 305, which may be any suitable programmatic method or object.

Alternatively, the plurality of event recognizers may independently process 626 the sequence of one or more sub-events in parallel.

In some embodiments, one or more event recognizers may be configured as exclusive event recognizers 628, as discussed above with respect to FIGS. 3B and 3C's exclusivity flags 324 and 364, respectively. When an event recognizer is configured as an exclusive event recognizer, the event delivery system prevents any other event recognizers for actively involved views (except those listed in the exception list 326, 366 of the event recognizer that recognizes the event) in the view hierarchy from receiving subsequent sub-events (of the same sequence of sub-events) after the exclusive event recognizer recognizes an event. Furthermore, when a non-exclusive event recognizer recognizes an event, the event delivery system prevents any exclusive event recognizers for actively involved views in the view hierarchy from receiving subsequent sub-events, except for those (if any) listed in the exception list 326, 366 of the event recognizer that recognizes the event.

In some embodiments, exclusive event recognizers may include 630 an event exception list, as discussed above with respect to FIGS. 3B and 3C's exclusivity exception lists 326 and 366, respectively. As noted in the discussion of FIG. 5C above, an event recognizer's exclusivity exception list can be used to permit event recognizers to continue with event recognition even when the sequence of sub-events making up their respective event definitions overlap. Accordingly, in some embodiments, the event exception list includes events whose corresponding event definitions have repetitive sub-events 632, such as the single tap/double tap event example of FIG. 5C.

Alternately, the event definition may define a user input operation 634.

In some embodiments, one or more event recognizers may be adapted to delay delivering every sub-event of the sequence of sub-events until after the event is recognized.

The method 600 detects 636 a sequence of one or more sub-events, and in some embodiments, the sequence of one or more sub-events may include primitive touch events 638. Primitive touch events may include, without limitation, basic components of a touch-based gesture on a touch-sensitive surface, such as data related to an initial finger or stylus touch down, data related to initiation of multi-finger or stylus movement across a touch-sensitive surface, dual finger movements in opposing directions, stylus lift off from a touch-sensitive surface, etc.

Sub-events in the sequence of one or more sub-events can include many forms, including without limitation, key presses, key press holds, key press releases, button presses, button press holds, button press releases, joystick movements, mouse movements, mouse button presses, mouse button releases, pen stylus touches, pen stylus movements, pen stylus releases, oral instructions, detected eye movements, biometric inputs, and detected physiological changes in a user, among others.

The method 600 identifies 640 one of the views of the view hierarchy as a hit view. The hit view establishes which views in the view hierarchy are actively involved views. An example is depicted in FIG. 3A, where the actively involved views 306 include search results panel 304, and maps view 305 because touch sub-event 301 contacted the area associated with the maps view 305.

In some embodiments, a first actively involved view within the view hierarchy may be configured 642 to prevent delivery of the respective sub-event to event recognizers associated with that first actively involved view. This behavior can implement the skip property discussed above with respect to FIGS. 3B and 3C (330 and 370, respectively). When the skip property is set for an event recognizer, delivery of the respective sub-event is still performed for event recognizers associated with other actively involved views in the view hierarchy.

Alternately, a first actively involved view within the view hierarchy may be configured 644 to prevent delivery of the respective sub-event to event recognizers associated with that first actively involved view unless the first actively involved view is the hit view. This behavior can implement the conditional skip property discussed above with respect to FIGS. 3B and 3C (332 and 372, respectively).

In some embodiments, a second actively involved view within the view hierarchy is configured 646 to prevent delivery of the respective sub-event to event recognizers associated with the second actively involved view and to event recognizers associated with ancestors of the second actively involved view. This behavior can implement the stop property discussed above with respect to FIGS. 3B and 3C (328 and 368, respectively).

The method 600 delivers 648 a respective sub-event to event recognizers for each actively involved view within the view hierarchy. In some embodiments, event recognizers for actively involved views in the view hierarchy process the respective sub-event prior to processing a next sub-event in the sequence of sub-events. Alternately, event recognizers for the actively involved views in the view hierarchy make their sub-event recognition decisions while processing the respective sub-event.

In some embodiments, event recognizers for actively involved views in the view hierarchy may process the sequence of one or more sub-events concurrently 650; alternatively, event recognizers for actively involved views in the view hierarchy may process the sequence of one or more sub-events in parallel.

In some embodiments, one or more event recognizers may be adapted to delay delivering 652 one or more sub-events of the sequence of sub-events until after the event recognizer recognizes the event. This behavior reflects a delayed event. For example, consider a single tap gesture in a view for which multiple tap gestures are possible. In that case, a tap event becomes a "tap+delay" recognizer. In essence, when an event recognizer implements this behavior, the event recognizer will delay event recognition until it is certain that the sequence of sub-events does in fact correspond to its event definition. This behavior may be appropriate when a recipient view is incapable of appropriately responding to cancelled events. In some embodiments, an event recognizer will delay updating its event recognition status to its respective actively involved view until the event recognizer is certain that the sequence of sub-events does not correspond to its event definition. As discussed above with respect to FIGS. 3B and 3C, delay began flag 328, 368, delay touch end flag 330, 370, and touch cancellation flag 332, 372 are provided to tailor sub-event delivery techniques, as well as event recognizer and view status information updates to specific needs.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed at an electronic device with a touch-sensitive surface, the method comprising:
    detecting a sequence of sub-events as part of a touch event associated with a view;
    determining that the sequence of sub-events does not correspond to one of one or more predefined sequences of sub-events for the view associated with the touch event; and
    in accordance with a determination that the sequence of sub-events does not correspond to one of the one or more predefined sequences of sub-events, sending a touch cancel event to the view associated with the touch event.

2. The method of claim 1, further comprising:
    in accordance with a determination that the sequence of sub-events corresponds to one of the one or more predefined sequences of sub-events, sending at least a subset of the sequence of sub-events to the view associated with the touch event.

3. The method of claim 1, further comprising:
    in accordance with the determination that the sequence of sub-events does not correspond to one of the one or more predefined sequences of sub-events, ignoring a touch corresponding to the touch event.

4. The method of claim 1, wherein the view has one or more event recognizers, and an event recognizer, corresponding to the one of the one or more predefined sequences of sub-events, of the one or more event recognizers is configured to ignore the touch event in accordance with the touch cancel event.

5. An electronic device, comprising:
    a touch-sensitive surface;
    one or more processors; and
    memory storing one or more programs for execution by the one or more processors, the one or more programs including instructions for:
        detecting a sequence of sub-events as part of a touch event associated with a view;
        determining that the sequence of sub-events does not correspond to one of one or more predefined sequences of sub-events for the view associated with the touch event; and
        in accordance with a determination that the sequence of sub-events does not correspond to one of the one or more predefined sequences of sub-events, sending a touch cancel event to the view associated with the touch event.

6. The device of claim 5, wherein the one or more programs further comprise instructions for:
    in accordance with a determination that the sequence of sub-events corresponds to one of the one or more predefined sequences of sub-events, sending at least a subset of the sequence of sub-events to the view associated with the touch event.

7. The device of claim 5, wherein the view has one or more event recognizers, and an event recognizer, corresponding to the one of the one or more predefined sequences of sub-events, of the one or more event recognizers is configured to ignore the touch event in accordance with the touch cancel event.

8. A non-transitory computer readable storage medium, storing one or more programs for execution by one or more processors of an electronic device with a touch-sensitive surface, the one or more programs including instructions for:
   detecting a sequence of sub-events as part of a touch event associated with a view;
   determining that the sequence of sub-events does not correspond to one of one or more predefined sequences of sub-events for the view associated with the touch event; and
   in accordance with a determination that the sequence of sub-events does not correspond to one of the one or more predefined sequences of sub-events, sending a touch cancel event to the view associated with the touch event.

9. The computer readable storage medium of claim 8, wherein the one or more programs further comprise instructions for:
   in accordance with a determination that the sequence of sub-events corresponds to one of the one or more predefined sequences of sub-events, sending at least a subset of the sequence of sub-events to the view associated with the touch event.

10. The computer readable storage medium of claim 8, wherein the view has one or more event recognizers, and an event recognizer, corresponding to the one of the one or more predefined sequences of sub-events, of the one or more event recognizers is configured to ignore the touch event in accordance with the touch cancel event.

11. A method performed at an electronic device with a touch-sensitive surface, the method comprising:
   detecting a sequence of sub-events as part of a touch event associated with a view;
   determining that the sequence of sub-events does not correspond to one of one or more predefined sequences of sub-events for the view associated with the touch event; and
   in accordance with a determination that the sequence of sub-events does not correspond to one of the one or more predefined sequences of sub-events, canceling the touch event.

12. The method of claim 11, further comprising:
   in accordance with a determination that the sequence of sub-events corresponds to one of the one or more predefined sequences of sub-events, sending at least a subset of the sequence of sub-events to the view associated with the touch event.

13. The method of claim 11, wherein canceling the touch event includes ignoring a touch corresponding to the touch event.

14. The method of claim 11, wherein the view has one or more event recognizers, and an event recognizer, corresponding to the one of the one or more predefined sequences of sub-events, of the one or more event recognizers is configured to ignore the touch event in accordance with the canceling of the touch event.

15. An electronic device, comprising:
   a touch-sensitive surface;
   one or more processors; and
   memory storing one or more programs for execution by the one or more processors, the one or more programs including instructions for:
      detecting a sequence of sub-events as part of a touch event associated with a view;
      determining that the sequence of sub-events does not correspond to one of one or more predefined sequences of sub-events for the view associated with the touch event; and
      in accordance with a determination that the sequence of sub-events does not correspond to one of the one or more predefined sequences of sub-events, canceling the touch event.

16. The device of claim 15, wherein the one or more programs further comprise instructions for:
   in accordance with a determination that the sequence of sub-events corresponds to one of the one or more predefined sequences of sub-events, sending at least a subset of the sequence of sub-events to the view associated with the touch event.

17. The device of claim 15, wherein the view has one or more event recognizers, and an event recognizer, corresponding to the one of the one or more predefined sequences of sub-events, of the one or more event recognizers is configured to ignore the touch event in accordance with the canceling of the touch event.

18. A non-transitory computer readable storage medium, storing one or more programs for execution by one or more processors of an electronic device with a touch-sensitive surface, the one or more programs including instructions for:
   detecting a sequence of sub-events as part of a touch event associated with a view;
   determining that the sequence of sub-events does not correspond to one of one or more predefined sequences of sub-events for the view associated with the touch event; and
   in accordance with a determination that the sequence of sub-events does not correspond to one of the one or more predefined sequences of sub-events, canceling the touch event.

19. The computer readable storage medium of claim 18, wherein the one or more programs further comprise instructions for:
   in accordance with a determination that the sequence of sub-events corresponds to one of the one or more predefined sequences of sub-events, sending at least a subset of the sequence of sub-events to the view associated with the touch event.

20. The computer readable storage medium of claim 18, wherein the view has one or more event recognizers, and an event recognizer, corresponding to the one of the one or more predefined sequences of sub-events, of the one or more event recognizers is configured to ignore the touch event in accordance with the canceling of the touch event.

* * * * *